US010067347B2

(12) United States Patent
Vallius et al.

(10) Patent No.: US 10,067,347 B2
(45) Date of Patent: Sep. 4, 2018

(54) WAVEGUIDES WITH IMPROVED INTENSITY DISTRIBUTIONS

(71) Applicant: Microsoft Technology Licensing, LLC, Redmond, WA (US)

(72) Inventors: Tuomas Vallius, Espoo (FI); Jani Tervo, Espoo (FI); Pasi Pietila, Espoo (FI)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 70 days.

(21) Appl. No.: 15/097,929

(22) Filed: Apr. 13, 2016

(65) Prior Publication Data

US 2017/0299865 A1     Oct. 19, 2017

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/0035* (2013.01);
(Continued)

(58) Field of Classification Search
CPC ............................ G02B 6/0016; G02B 6/0035
See application file for complete search history.

(56) References Cited

U.S. PATENT DOCUMENTS 5,157,537 A    10/1992  Rosenblatt
5,337,183 A    8/1994   Rosenblatt
(Continued)

FOREIGN PATENT DOCUMENTS

CN    104035157 A    9/2014
CN    104280885 A    1/2015
(Continued)

OTHER PUBLICATIONS

Han, et al., "Portable Waveguide Display System with a Large Field of view by Integrating Freeform Elements and Volume Holograms", In Optics Express, vol. 23, Issue 3, Feb. 9, 2015, pp. 3534-3549.
(Continued)

*Primary Examiner* — Kimberly N Kakalec
(74) *Attorney, Agent, or Firm* — Arent Fox LLP

(57) ABSTRACT

An apparatus for use in replicating an image associated with an input-pupil to an output-pupil, comprises an optical waveguide including input-coupler, one or more intermediate-components and an output-coupler. The input-coupler couples light corresponding to the image into the optical waveguide and diffracts the light corresponding to the image in at least two different directions so that light corresponding to the image is diffracted toward each of the one or more intermediate-components. The intermediate-component(s) is/are configured to individually or collectively perform both odd-order pupil expansion and even-order pupil expansion on light corresponding to the image that travels from the input-coupler to the one or more intermediate-components by way of TIR, and diffract the light corresponding to the image towards the output-coupler. The output-coupler is configured to couple the light corresponding to the image out of the optical waveguide so that the light corresponding to the image is viewable from the output-pupil.

20 Claims, 8 Drawing Sheets

(51) Int. Cl.
*G02B 27/00* (2006.01)
*G02B 27/42* (2006.01)
(52) U.S. Cl.
CPC ..... *G02B 27/0081* (2013.01); *G02B 27/4205* (2013.01); *G02B 2027/0123* (2013.01); *G02B 2027/0125* (2013.01); *G02B 2027/0174* (2013.01)

(56) References Cited

U.S. PATENT DOCUMENTS

| | | | |
|---|---|---|---|
| 5,587,816 | A | 12/1996 | Gunjima et al. |
| 6,529,331 | B2 | 3/2003 | Massof et al. |
| 6,563,648 | B2 | 5/2003 | Gleckman et al. |
| 6,750,996 | B2 | 6/2004 | Jagt et al. |
| 7,206,107 | B2 | 4/2007 | Levola |
| 7,483,604 | B2 | 1/2009 | Levola |
| 7,724,442 | B2 | 5/2010 | Amitai |
| 7,764,413 | B2 | 7/2010 | Levola |
| 7,876,489 | B2 | 1/2011 | Gandhi et al. |
| 8,160,411 | B2 | 4/2012 | Levola et al. |
| 8,169,704 | B2 | 5/2012 | Saito |
| 8,233,204 | B1 | 7/2012 | Robbins et al. |
| 8,314,993 | B2 | 11/2012 | Levola |
| 8,320,032 | B2 | 11/2012 | Levola |
| 8,411,365 | B2 | 4/2013 | Saito |
| 8,466,953 | B2 | 6/2013 | Levola |
| 8,508,848 | B2 | 8/2013 | Saarikko |
| 8,547,638 | B2 | 10/2013 | Levola |
| 8,593,734 | B2 | 11/2013 | Laakkonen |
| 8,654,420 | B2 | 2/2014 | Simmonds |
| 8,736,963 | B2 | 5/2014 | Robbins et al. |
| 8,749,890 | B1 | 6/2014 | Wood et al. |
| 8,755,113 | B2 | 6/2014 | Gardner et al. |
| 8,773,599 | B2 | 7/2014 | Saeedi et al. |
| 8,885,254 | B2 | 11/2014 | Saito et al. |
| 8,903,207 | B1 | 12/2014 | Brown et al. |
| 8,913,324 | B2 | 12/2014 | Schrader |
| 8,934,171 | B2 | 1/2015 | Desserouer |
| 8,947,783 | B2 | 2/2015 | Gupta et al. |
| 8,989,535 | B2 | 3/2015 | Robbins |
| 9,097,890 | B2 | 8/2015 | Miller et al. |
| 9,124,066 | B2 | 9/2015 | Sridharan et al. |
| 9,164,290 | B2 | 10/2015 | Robbins et al. |
| 9,274,338 | B2 | 3/2016 | Robbins et al. |
| 9,494,799 | B2 | 11/2016 | Robbins et al. |
| 9,664,824 | B2 | 5/2017 | Simmonds et al. |
| 9,766,464 | B2 | 9/2017 | Poon et al. |
| 9,791,696 | B2 | 10/2017 | Woltman et al. |
| 2004/0184699 | A1 | 9/2004 | Yeralan |
| 2007/0188837 | A1 | 8/2007 | Shimizu et al. |
| 2009/0303599 | A1 | 12/2009 | Levola |
| 2010/0141868 | A1 | 6/2010 | St. Hilaire et al. |
| 2010/0321781 | A1* | 12/2010 | Levola .............. G02B 27/0081 359/569 |
| 2011/0007241 | A1 | 1/2011 | Hwang et al. |
| 2011/0026892 | A1 | 2/2011 | Lin et al. |
| 2011/0096401 | A1* | 4/2011 | Levola ................ G02B 6/0016 359/573 |
| 2012/0092750 | A1 | 4/2012 | Kroll et al. |
| 2013/0250430 | A1 | 9/2013 | Robbins et al. |
| 2013/0314789 | A1 | 11/2013 | Saarikko et al. |
| 2014/0104665 | A1 | 4/2014 | Popovich et al. |
| 2014/0140653 | A1 | 5/2014 | Brown et al. |
| 2014/0140654 | A1 | 5/2014 | Brown et al. |
| 2014/0168260 | A1 | 6/2014 | O'Brien et al. |
| 2014/0240834 | A1* | 8/2014 | Mason .............. G02B 27/0081 359/567 |
| 2014/0300966 | A1 | 10/2014 | Travers et al. |
| 2015/0125109 | A1 | 5/2015 | Robbins et al. |
| 2015/0160529 | A1 | 6/2015 | Popovich et al. |
| 2015/0168802 | A1 | 6/2015 | Bohn |
| 2015/0219842 | A1 | 8/2015 | Sqalli et al. |
| 2015/0260994 | A1 | 9/2015 | Akutsu et al. |
| 2015/0268399 | A1 | 9/2015 | Futterer |
| 2015/0277116 | A1 | 10/2015 | Richards et al. |
| 2016/0033698 | A1 | 2/2016 | Escuti et al. |
| 2016/0320536 | A1* | 11/2016 | Simmonds .......... G02B 27/0081 |

FOREIGN PATENT DOCUMENTS

| | | |
|---|---|---|
| GB | 2521535 A | 6/2015 |
| WO | 2006064334 A1 | 6/2006 |
| WO | 2014056631 A1 | 4/2014 |
| WO | 2014080155 A1 | 5/2014 |
| WO | 2014091204 A1 | 6/2014 |
| WO | WO2016020643 A1 | 2/2016 |

OTHER PUBLICATIONS

"SBG Labs Delivers Transparent Display with Large Exit Pupil and Wide FOV for HMDS", Published on: Dec. 2012, Available at: http://www.digilens.com/sbg-labs-delivers-transparent-display-with-large-exit-pupil-and-wide-fov-for-hmds/.
Äyräs, et al., "Exit Pupil Expander with a Large Field of View Based on Diffractive Optics", In Journal of the Society for Information Display, vol. 17, Issue 8, Aug. 2009, 1 page.
Urey, Hakan, "Diffractive Exit-Pupil Expander for Display Applications", In Journal of Applied Optics, vol. 40, Issue 32, Nov. 10, 2001, pp. 5840-5851.
Kiyokawa, Kiyoshi, "A Wide Field-of-view Head Mounted Projective Display using Hyperbolic Half-silvered Mirrors", In Proceedings of the 6th IEEE and ACM International Symposium on Mixed and Augmented Reality, Nov. 13, 2007, 4 pages.
Rolland, et al., "Head-Mounted Display Systems", In Proceedings of Encyclopedia of optical engineering, Jan. 2005, pp. 1-14.
Kress, et al., "Diffractive and Holographic Optics as Optical Combiners in Head Mounted Displays", In Proceedings of the ACM conference on Pervasive and ubiquitous computing adjunct publication, Sep. 8, 2013, pp. 1479-1482.
Davidson, et al., "Diffractive Elements for Annular Laser Beam Transformation", In Journal of Applied Physics Letters, vol. 61, Issue 4, Jul. 27, 1992, pp. 381-383.
U.S. Appl. No. 15/097,661, filed Apr. 13, 2016 by Vallius et al.
Ex Parte Quayle dated Apr. 4, 2017, in U.S. Appl. No. 15/097,661, filed Apr. 13, 2016.
Notice of Allowance dated Jun. 12, 2017, in U.S. Appl. No. 15/097,661, filed Apr. 13, 2016.
International Search Report and the Written Opinion, in International Patent Application No. PCT/US2017/026254 filed Apr. 6, 2017.
Levola, "Invited Paper: Diffractive Optics for Virtual Reality Displays", Conference Record of the International Display ResearchConference, Jan. 1, 2005, vol. 2005, pp. 542-545.
"Waveguide-based Displays Maturing for Augmented Reality Applications", Retrieved from <<https://web.archive.org/web/20160419212709/http://www.displaydaily.com/articles/446-free-sponsored-contents/sponsored-articles/14132-waveguide-based-displays-maturing-for-augmented-reality-applications>>, Apr. 19, 2016, 5 Pages.
"Non-final Office Action Issued in U.S. Appl. No. 15/262,282", dated Nov. 8, 2017, 13 Pages.
Ishiguro, et al., "Bragg-Type Polarization Gratings Formed in Thick Polymer Films Containing Azobenzene and Olane Moietie", In Journal of Langmuir, vol. 23, Issue 1, Sep. 9, 2006, 2 Pages.
Okayama, et al., "Polarization Rotation Bragg Grating Using Si Wire Waveguide With Non-Vertical Sidewall", In Journal of Optics Express, vol. 22, Issue 25, Dec. 11, 2014, pp. 31371-31378.

* cited by examiner

*(top view)*

WAVEGUIDES WITH IMPROVED INTENSITY DISTRIBUTIONS

BACKGROUND

Various types of computing, entertainment, and/or mobile devices can be implemented with a transparent or semi-transparent display through which a user of a device can view the surrounding environment. Such devices, which can be referred to as see-through, mixed reality display device systems, or as augmented reality (AR) systems, enable a user to see through the transparent or semi-transparent display of a device to view the surrounding environment, and also see images of virtual objects (e.g., text, graphics, video, etc.) that are generated for display to appear as a part of, and/or overlaid upon, the surrounding environment. These devices, which can be implemented as head-mounted display (HMD) glasses or other wearable display devices, but are not limited thereto, often utilize optical waveguides to replicate an image, e.g., produced by a display engine, to a location where a user of a device can view the image as a virtual image in an augmented reality environment. As this is still an emerging technology, there are certain challenges associated with utilizing waveguides to display images of virtual objects to a user.

SUMMARY

Certain embodiments of the present technology relate to an apparatus for use in replicating an image associated with an input-pupil to an output-pupil, comprises an optical waveguide including an input-coupler, one or more intermediate-components and an output-coupler. The input-coupler couples light corresponding to the image and associated with the input-pupil into the optical waveguide and diffracts the light corresponding to the image in at least two different directions so that light corresponding to the image is diffracted toward each of the one or more intermediate-components. The intermediate-component(s) is/are configured to individually or collectively perform both odd-order pupil expansion and even-order pupil expansion on light corresponding to the image that travels from the input-coupler to the one or more intermediate-components by way of TIR, and diffract the light corresponding to the image towards the output-coupler. The output-coupler is configured to couple the light corresponding to the image, that has travelled from the one or more intermediate-components to the output-coupler by way of TIR, out of the optical waveguide so that the light corresponding to the image is viewable from the output-pupil.

In certain embodiments, the optical waveguide includes only one intermediate-component. In other embodiments, the optical waveguide includes at least two intermediate-components.

The light that experiences odd-order pupil expansion changes propagation direction an odd number of times before being incident on the output-coupler. By contrast, the light that experiences even-order pupil expansion changes propagation direction an even number of times before being incident on the output-coupler, and thus, travels a different path length than light that experiences even-order pupil expansion.

A more uniform intensity distribution is achieved by the input-coupler diffracting the light corresponding to the image in at least two different directions so that light corresponding to the image is diffracted toward each of the one or more intermediate-components, and by the one or more intermediate-components individually or collectively performing both odd-order and even-order pupil expansion, compared to if the input-coupler diffracted the light corresponding to the image in only one direction towards an intermediate-component that performed only one of odd-order or even-order pupil expansion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
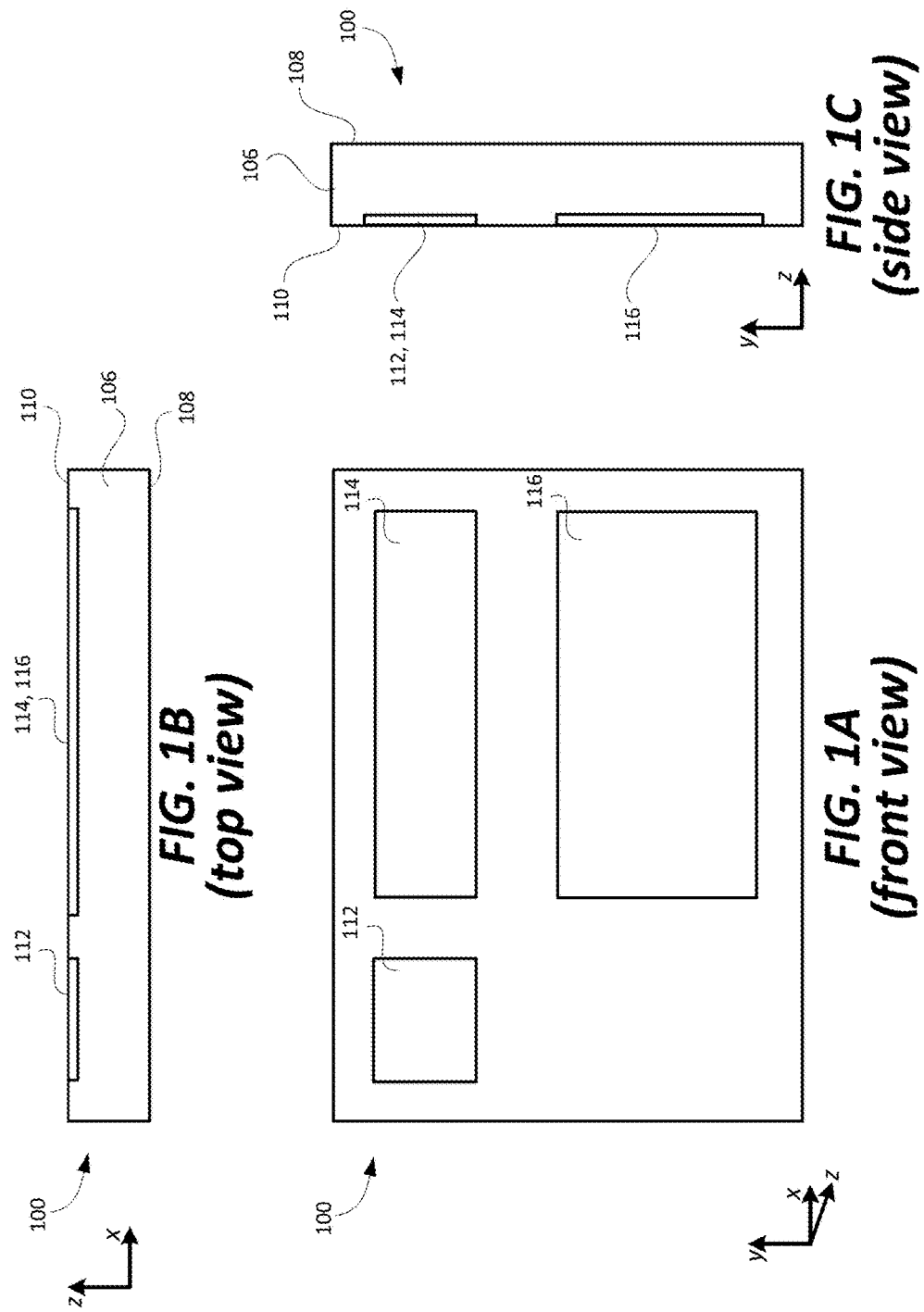
FIGS. 1A, 1B and 1C are front, top and side views, respectively, of an exemplary waveguide that can be used to replicate an image associated with an input-pupil to an expanded output-pupil.

Certain embodiments of the present technology relate to apparatuses for use in replicating an image associated with an input-pupil to an output-pupil. Such an apparatus can include an optical waveguide including an input-coupler, one or more intermediate-components and an output-coupler. The input-coupler couples light corresponding to the image and associated with the input-pupil into the optical waveguide and diffracts the light corresponding to the image in at least two different directions so that light corresponding to the image is diffracted toward each of the one or more intermediate-components. The intermediate-component(s) is/are configured to individually or collectively perform both odd-order pupil expansion and even-order pupil expansion on light corresponding to the image that travels from the input-coupler to the one or more intermediate-components by way of TIR, and diffract the light corresponding to the image towards the output-coupler. The output-coupler is configured to couple the light corresponding to the image, that has travelled from the one or more intermediate-components to the output-coupler by way of TIR, out of the optical waveguide so that the light corresponding to the image is viewable from the output-pupil.

In the description that follows, like numerals or reference designators will be used to refer to like parts or elements throughout. In addition, the first digit of a three digit reference number, or the first two digits of a four digit reference number, identifies the drawing in which the reference number first appears.

FIGS. 1A, 1B and 1C are front, top and side views, respectively, of an exemplary optical waveguide 100 that can be used to replicate an image associated with an input-pupil to an expanded output-pupil. The term "input-pupil," as used herein, refers to an aperture through which light corresponding to an image is overlaid on an input-coupler of a waveguide. The term "output-pupil," as used herein, refers to an aperture through which light corresponding to an image exits an output-coupler of a waveguide. An input-pupil is sometimes also referred to as an entrance-pupil, and an output-pupil is sometimes also referred to as an exit-pupil. The optical waveguide 100 will often be referred to hereafter more succinctly simply as a waveguide 100. As will be discussed in further detail below with reference to FIG. 2, the image that the waveguide 100 is being used to replicate, and likely also expand, can be generated using a display engine.

Referring to FIGS. 1A, 1B and 1C, the optical waveguide 100 includes a bulk-substrate 106 having an input-coupler 112 and an output-coupler 116. The input-coupler 112 is configured to couple light corresponding to an image associated with an input-pupil into the bulk-substrate 106 of the waveguide. The output-coupler 116 is configured to couple the light corresponding to the image associated with the input-pupil, which travels in the optical waveguide 100 from the input-coupler 112 to the output-coupler 116, out of the waveguide 100 so that the light is output and viewable from the output-pupil.

The bulk-substrate 106, which can be made of glass or optical plastic, but is not limited thereto, includes a first major planar surface 108 and a second major planar surface 110 opposite and parallel to the first major planar surface 108. The first major planar surface 108 can alternatively be referred to as the front-side major surface 108 (or more simply the front-side surface 108), and the second major planar surface 110 can alternatively be referred to as the back-side major surface 110 (or more simply the back-side surface 110). As the term "bulk" is used herein, a substrate is considered to be "bulk" substrate where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 μm. In accordance with certain embodiments, the bulk-substrate 106 has a thickness of at least 25 μm between its major planar surfaces 108 and 110. In specific embodiments, the bulk-substrate 106 has a thickness (between its major surfaces) within a range of 25 μm to 1000 μm. The bulk-substrate 106, and more generally the waveguide 100, is transparent, meaning that it allows light to pass through it so that a user can see through the waveguide 100 and observe objects on an opposite side of the waveguide 100 than the user's eye(s).

The optical waveguide 100 in FIGS. 1A, 1B and 1C is also shown as including an intermediate-component 114, which can alternatively be referred to as an intermediate-zone 114. Where the waveguide 100 includes the intermediate-component 114, the input-coupler 112 is configured to couple light into the waveguide 100 (and more specifically, into the bulk-substrate 106 of the waveguide 100) and in a direction of the intermediate-component 114. The intermediate-component 114 is configured to redirect such light in a direction of the output-coupler 116. Further, the intermediate-component 114 is configured to perform one of horizontal or vertical pupil expansion, and the output-coupler 116 is configured to perform the other one of horizontal or vertical pupil expansion. For example, the intermediate-component 114 can be configured to perform horizontal pupil expansion, and the output-coupler 116 can be configured to vertical pupil expansion. Alternatively, if the intermediate-component 114 were repositioned, e.g., to be below the input-coupler 112 and to the left of the output-coupler 116 shown in FIG. 1A, then the intermediate-component 114 can be configured to perform vertical pupil expansion, and the output-coupler 116 can be configured to perform horizontal pupil expansion.

The input-coupler 112, the intermediate-component 114 and the output-coupler 116 can be referred to collectively herein as optical components 112, 114 and 116 of the waveguide, or more succinctly as components 112, 114 and 116.

It is possible that a waveguide includes an input-coupler and an output-coupler, without including an intermediate-components. In such embodiments, the input-coupler would be configured to couple light into the waveguide and in a direction toward the output-coupler. In such embodiments, the output-coupler can provide one of horizontal or vertical pupil expansion, depending upon implementation.

In FIG. 1A, the input-coupler 112, the intermediate-component 114 and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate-component can have a triangular or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate-component 114 and the output-coupler 116, which are not intended to be all encompassing.

As can best be appreciated from FIGS. 1B and 1C, the input-coupler 112, the intermediate-component 114 and the output-coupler 116 are all shown as being provided in or on a same surface (i.e., the back-side surface 110) of the waveguide 100. In such a case, the input-coupler 112 can be transmissive (e.g., a transmission grating), the intermediate-component 114 can be reflective (e.g., a reflective grating), and the output-coupler 116 can also be reflective (e.g., a further reflective grating). The input-coupler 112, the intermediate-component 114 and the output-coupler 116 can alternatively all be provided in the front-side surface 110 of the waveguide 100. In such a case, the input-coupler 112 can be reflective (e.g., a reflective grating), the intermediate-component 114 can be reflective (e.g., a further reflective grating), and the output-coupler 116 can also be transmissive (e.g., a transmission grating).

Alternatively, the input-coupler 112, the intermediate-component 114 and the output-coupler 116 can all be embedded (also referred to as immersed) in the bulk-substrate 106. For example, the bulk-substrate 106 can be separated into two halves (that are parallel to the major surfaces 108 and 110), and the input-coupler 112, the intermediate-component 114 and the output-coupler 116 can be provided in (e.g., etched into) one of the inner surfaces of the two halves, and the inner surfaces of the two halves can be adhered to one another. Alternatively, the bulk-substrate 106 can be separated into two halves (that are parallel to the major surfaces 108 and 110), and the input-coupler 112, the intermediate-component 114 and the output-coupler 116 can be provided between the inner surfaces of the two halves. Other implementations for embedding the input-coupler 112, the intermediate-component 114 and the output-coupler 116 in the bulk-substrate 106 are also possible, and within the scope of the embodiments described herein. It is also possible that one of the input-coupler 112, the intermediate-component 114 and the output-coupler 116 is provided in or on the front-side surface 108 of the waveguide 108, another one of the components 112, 114 and 116 is provided in or on the back-side surface 110, and the last one of the components 112, 114 and 116 is embedded or immersed in the bulk-substrate 106. More generally, unless stated otherwise, any individual one of the input-coupler 112, the intermediate-component 114 and the output-coupler 116 can be provided in or on either one of the major planar surfaces 108 or 110 of the bulk-substrate 106, or embedded therebetween.

The input-coupler 112, the intermediate-component 114 and the output-coupler 116 can each be implemented as a diffraction grating, or more generally, as a diffractive optical element (DOE). A diffraction grating is an optical component that may contain a periodic structure that causes incident light to split and change direction due to an optical phenomenon known as diffraction. The splitting (known as optical orders) and angle change depend on the characteristics of the diffraction grating. When the periodic structure is on the surface of an optical component, it is referred to a surface grating. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The nature of the diffraction by an SRG depends on the wavelength, polarization and angle of light incident on the SRG and various optical characteristics of the SRG, such as refractive index, line spacing, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components. An SRG is an example of a Diffractive Optical Element (DOE). When a DOE is present on a surface (e.g. when the DOE is an SRG), the portion of that surface spanned by that DOE can be referred to as a DOE area. A diffraction grating, instead of being a surface grating, can alternatively be a volume grating, such as a Bragg diffraction grating. It is also possible that one or more of the couplers are manufactured as SRGs and then covered within another material, e.g., using an aluminum deposition process, thereby essentially burying the SRGs such that the major planar waveguide surface(s) including the SRG(s) is/are substantially smooth. Such a coupler is one example of a hybrid of a surface and volume diffraction grating. Any one of the input-coupler 112, the intermediate-component 114 and the output-coupler 116 can be, e.g., a surface diffraction grating, or a volume diffraction grating, or a hybrid of a surface and volume diffraction grating. In accordance with embodiments described herein, each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Where the input-coupler 112, the intermediate-component 114 and/or the output-coupler 116 is an SRG, each such SRG can be etched into one of the major planar surfaces 108 or 110 of the bulk-substrate 106. In such embodiments, the SRG can be said to be formed "in" the bulk-substrate 106. Alternatively, each SRG can be physically formed in a coating that covers one of the major planar surfaces 108 or 110 of the bulk-substrate 106, in which case each such SRG can be said to be formed "on" the bulk-substrate 106. Either way, the components 112, 114 and 116 are considered parts of the waveguide 100.

Referring specifically to FIG. 1A, in an exemplary embodiment, the input-coupler 112 can have surface gratings that extend in a vertical (y) direction, the output-coupler 116 can have surface gratings that extend in a horizontal (x) direction, and the intermediate-component 114 can have surface gratings that extend diagonal (e.g., ~45 degrees) relative to the horizontal and vertical directions. This is just an example. Other variations are also possible.

More generally, the input-coupler 112, the intermediate-component 114 and the output-coupler 116 can have various different outer peripheral geometries, can be provided in or on either of the major planar surfaces of the bulk-substrate, or can be embedded in the bulk-substrate 106, and can be implemented using various different types of optical structures, as can be appreciated from the above discussion, and will further be appreciated from the discussion below.

In general, light corresponding to an image, which is coupled into the waveguide via the input-coupler 112, can travel through the waveguide from the input-coupler 112 to the output-coupler 114, by way of total internal refection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1)$$

where $\theta_c$ the critical angle for two optical mediums (e.g., the bulk-substrate 106, and air or some other medium that is adjacent to the bulk-substrate 106) that meet at a medium boundary, n1 is the index of refraction of the optical medium in which light is traveling towards the medium boundary (e.g., the bulk-substrate 106, once the light is couple therein), and n2 is the index of refraction of the optical medium beyond the medium boundary (e.g., air or some other medium adjacent to the bulk-substrate 106).

Figure 2:
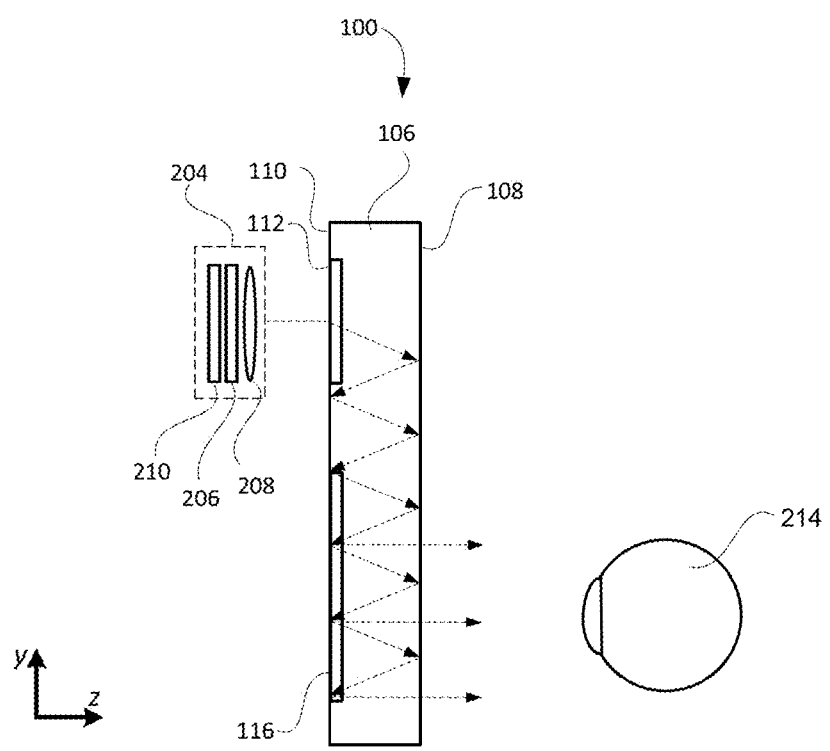
FIG. 2 is side view of the exemplary waveguide introduced with reference to FIGS. 1A, 1B and 1C, and also shows a display engine that generates an image including angular content that is coupled into the waveguide by an input-coupler, and also shows an eye that is viewing the image within an eye box that is proximate the output-coupler.

The concept of light traveling through the waveguide 100, from the input-coupler 112 to the output-coupler 114, by way of TIR, can be better appreciated from FIG. 2, which is discussed below. Referring now to FIG. 2, as in FIG. 1C, FIG. 2 shows a side view of the waveguide 100, but also shows a display engine 204 that generates an image including angular content that is coupled into the waveguide by the input-coupler 112. Also shown in FIG. 2, is representation of a human eye 214 that is using the waveguide 100 to observe an image, produced using the display engine 204, as a virtual image.

The display engine 204 can include, e.g., an image former 206, a collimating lens 208 and an illuminator 210, but is not limited thereto. The image former 206 can be implemented using a transmissive projection technology where a light source is modulated by an optically active material, and backlit with white light. These technologies are usually implemented using liquid crystal display (LCD) type displays with powerful backlights and high optical energy densities. The illuminator 210 can provide the aforementioned backlighting. The image former 206 can also be implemented using a reflective technology for which external light is reflected and modulated by an optically active material. Digital light processing (DLP), liquid crystal on silicon (LCOS) and Mirasol® display technology from Qualcomm, Inc. are all examples of reflective technologies. Alternatively, the image former 206 can be implemented using an emissive technology where light is generated by a display, see for example, a PicoP™ display engine from Microvision, Inc. Another example of emissive display technology is a micro organic light emitting diode (OLED) display. Companies such as eMagin and Microoled provide examples of micro OLED displays. The image former 206, alone or in combination with the illuminator 210, can also be referred to as a micro display. The collimating lens 208 is arranged to receive a diverging display image from the image former 206, to collimate the display image, and to direct the collimated image toward the input-coupler 112 of the waveguide 100. In accordance with an embodiment, an entry pupil associated with the waveguide may be approximately the same size as an exit pupil associated with the image former 206, e.g., 5 mm or less in some embodiments, but is not limited thereto.

In FIG. 2, the display engine 204 is shown as facing the back-side surface 110 of the waveguide 100, and the eye 214 is shown as facing the front-side surface 108 opposite and parallel to the back-side surface 110. This provides for a periscope type of configuration in which light enters the waveguide on one side of the waveguide 100, and exits the waveguide at an opposite side of the waveguide 100. Alternatively, the input-coupler 112 and the output-coupler 116 can be implemented in a manner such that the display engine 204 and the eye 214 are proximate to and face a same major planar surface (108 or 110).

The waveguide 100 can be incorporated into a see-through mixed reality display device system, but is not limited to use therewith. A separate instance of the waveguide 100 and the display engine 204 can be provided for each of the left and right eyes of a user. In certain embodiments, such waveguide(s) 100 may be positioned next to or between see-through lenses, which may be standard lenses used in eye glasses and can be made to any prescription (including no prescription). Where a see-through mixed reality display device system is implemented as head-mounted display (HMD) glasses including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art.

Figure 3:
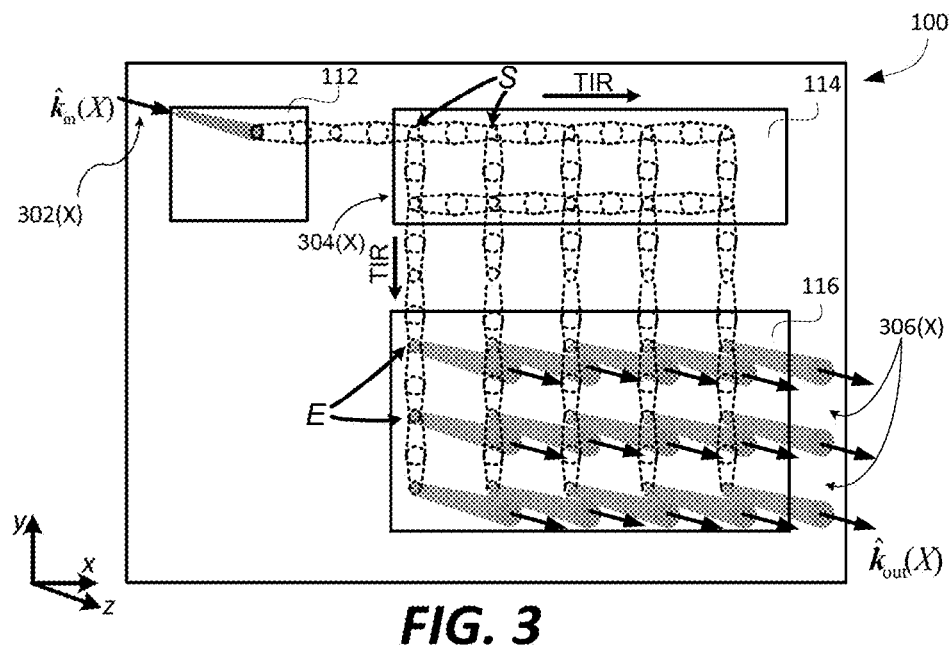
FIG. 3, which is similar to FIG. 1A because it provides a front view of the waveguide, is used to explain how light that is coupled into the waveguide by an input-coupler, travels by way of total internal reflection (TIR) from the input-coupler to an intermediate-component, and by way of TIR from the intermediate-component to an output-coupler, where it exits the waveguide.

FIG. 3, which is similar to FIG. 1A in that it provides a front view of the waveguide 100, will now be used to explain how light that is coupled into the waveguide 100 by the input-coupler 112, can travel by way of TIR from the input-coupler 112 to the intermediate-component 114, and by way of TIR from the intermediate-component 114 to the output-coupler 116, where it exits the waveguide 100. More specifically, as explained in more detail below, a combination of diffractive beam splitting and TIR within the waveguide 100 results in multiple versions of an input beam of light 302(X) being outwardly diffracted from the output-coupler 116 in both the length and the width of the output-coupler 116 as output beams 306(X) in respective outward directions (that is, away from the waveguide 100) that substantially match the respective inward direction $\hat{k}_{in}(X)$ of the corresponding input beam 302(X).

In FIG. 3, beams external to (e.g., entering or exiting) the waveguide 100 are represented using shading and dotted lines are used to represent beams within (i.e., internal to) the waveguide 100. Perspective is used to indicate propagation in the z-direction (i.e., towards or way from a user), with widening of the beams in FIG. 3 representing propagation in the positive z (i.e., +z) direction (that is towards the user).

Thus, diverging dotted lines represent beams within the waveguide propagating towards the front-side major surface 108 of the waveguide 100, with the widest parts (shown as large dotted circles) represent those beams striking the front-side major surface 108 of the waveguide 100, from which they are totally internally reflected back towards the back-side major surface 110 of the waveguide 100, which is represented by the dotted lines converging from the widest points to the narrowest points (shown as the small dotted circles) at which they are incident on the back-side major surface 110 of the waveguide 100.

Exemplary regions where a beam is incident on the intermediate-component 114 and splits into two beams, one of which travels in the horizontal direction and the other one of which travels in the vertical direction, are labeled S (for split or splitting). Exemplary regions where a beam is incident on the output-coupler 116 and exits the waveguide 100 are labeled E (for exit or exiting).

As illustrated, the input beam 302(X) is coupled into the waveguide 100, e.g., by way of diffraction, by the input-coupler 112, and propagates along a width of the input-coupler by way of TIR in the horizontal direction. This results in the beam 302(X) eventually striking the intermediate-component 114 at a left-most splitting region (S). When the beam 302(X) is incident at the left-most splitting region (S), that incident beam 302(X) is effectively split in two, e.g., by way of diffraction. This splitting creates a new version of that beam 304(X) (specifically a first-order diffraction mode beam) which is directed in a generally downwards vertical (−y) direction towards the output-coupler 116, in addition to a zero-order diffraction mode beam (i.e. unaffected by the diffractive component) that continues to propagate along the width of the intermediate-component 114 in the horizontal (+x) direction, just as the beam would in the absence of the intermediate-component 114 (albeit at a reduced intensity). Thus, a portion of the beam effectively continues to propagate along substantially the whole width of the intermediate-component 114, striking the intermediate-component 114 at various splitting regions (S), with another new version of the beam (in the same downward direction) created at each splitting region (S). As shown in FIG. 3, this results in multiple versions of the beam being directed toward, and incident on, the output-coupler 116, with the multiple versions of the beam being horizontally separated so as to collectively span substantially the width of the output-coupler 116.

As also shown in FIG. 3, each new version of the beam as created at a splitting region (S) may itself strike the intermediate-component 114 (e.g., a fold grating) during its downward propagation. This can result in a splitting of the new version of the beam, e.g., by way of diffraction, to create a further new version of that beam that is directed in a horizontal (+x) direction (which is a first-order reflection mode beam), in addition to a zero-order diffraction mode beam that continues to propagate in the downward vertical (−y) direction. This phenomenon may repeat numerous times within the waveguide, as can be appreciated from FIG. 3. FIG. 3 is not drawn to scale, as many more reflections and splitting of beams are likely to occur than illustrated in FIG. 3, e.g., as can be better appreciated from FIG. 4.

In FIG. 3, the output-coupler 116 is shown as being located below the intermediate-component 114, and thus, the downward-propagating versions of the beams will eventually be incident on the output-coupler 116, at which they are guided onto the various exit regions (E) associated with the output-coupler 116. The output-coupler 116 is configured so that when a version of the beam strikes the output-coupler, that beam is diffracted to create a first-order diffraction mode beam directed outwardly from the output-coupler 116, in an outward direction that substantially matches the unique inward direction in which the original beam 302(X) corresponding to an image point X was input. Because there are multiple versions of the beam propagating downwards that substantially span the width of the output-coupler 116, multiple output beams 306(X) are generated across the width of the output-coupler 116 (as shown in FIG. 3) to provide effective horizontal beam expansion, which can also be referred to as horizontal pupil expansion.

Moreover, the output-coupler 116 is configured so that, in addition to the outwardly diffracted beams 306(X) being created at the various exit regions (E) from an incident beam, a zero-order diffraction mode beam continues to propagate downwards in the same specific direction as that incident beam. This, in turn, strikes the output-coupler 116 at lower portions thereof in the manner illustrated in FIG. 3, resulting in both continuing zero-order and outward first-order beams. Thus, multiple output beams 306(X) are also generated across substantially the entire height of the output-coupler 116 to provide effective vertical beam expansion, which can also be referred to as vertical pupil expansion.

The output beams 306(X) are directed outwardly in outward directions that substantially match the unique input direction in which the original beam 302(X) is inputted. In this context, substantially matching means that the outward direction is related to the input direction in a manner that enables a user's eye to focus any combination of the output beams 306(X) to a single point on the retina, thus reconstructing the image point X from which the original beam 302(x) propagated or was otherwise emitted.

For a planar waveguide (i.e., a waveguide whose front-side and back-side major surfaces lie substantially parallel to the xy-plane in their entirety), the output beams 306(S) are substantially parallel to one another and propagate outwardly in an output propagation direction $\hat{k}_{out}(X)$ that is parallel to the unique inward direction $\hat{k}_{in}(X)$ in which the corresponding input beam 302(X) was directed to the input-coupler 112. That is, directing the beam 302(X) corresponding to the image point X to the input-coupler 112 in the inward direction $\hat{k}_{in}(X)$ causes corresponding output beams 306(X) to be directed (e.g., diffracted) outwardly and in parallel from the output-coupler 116, each in an outward propagation direction $\hat{k}_{out}(X)=\hat{k}_{in}(X)$ due to the configuration of the waveguide 100.

In the exemplary implementation described above, the intermediate-component 114 (e.g., a fold grating) is configured to provide horizontal pupil expansion, also referred to as effective horizontal beam expansion; and the output-coupler 116 is configured to provide vertical pupil expansion, also referred to as effective vertical beam expansion. Alternatively, the intermediate-component 114 can be repositioned, e.g., below the input-coupler 112 and to the side of the output-coupler 116, and the components 112, 114 and 116 can be reconfigured such that the intermediate-component 114 is configured to provide vertical pupil expansion, and the output-coupler 116 is configured to provide horizontal pupil expansion, as was noted above. While there are significant benefits to performing horizontal (or vertical) pupil expansion using the intermediate-component 114, the various zero-order and first-order diffraction modes caused by the intermediate-component 114 result in multiple-loop interference, which is explained below with reference to FIG. 4.

Figure 4:
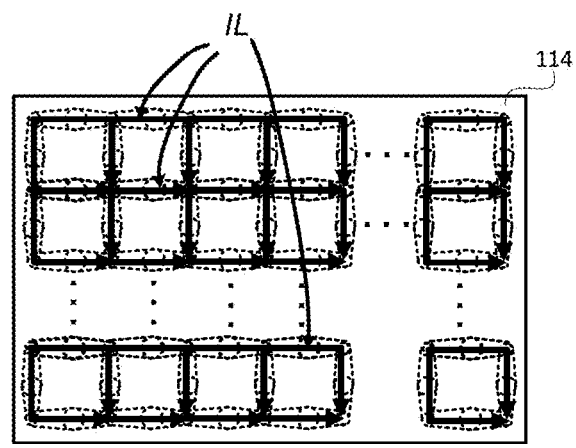
FIG. 4 conceptually illustrates how the intermediate-component of the exemplary waveguide, introduced in the earlier FIGS., can cause multiple-loop interference.

FIG. 4 is illustrative of the intermediate-component 114 of the waveguide 100, but does not show other components of the waveguide, such as the input-coupler 112 and the output-coupler 116. Referring to FIG. 4, the dark lined loops shown therein, which are labeled IL, are illustrative of multiple interference loops that occur within the intermediate-component 114, which can collectively be referred to as multiple-loop interference. Each of the multiple interference loops is analogous to the type of interference that occurs using a Mach-Zehnder interferometer. In each interference loop IL, the positions where two arrow heads meet are illustrative of positions where zero-order and first-order reflections of an input beam (e.g., the input beam 302(X)) are incident on same locations of the intermediate-component 114 at a same time. Such dark lines with arrows are representative of pathways of light traveling within intermediate-component 114 of the waveguide 100. If the optical-length of each pathway (also known as an optical path length) were the same, then when the light beams traveling to the same point via different pathways are recombined they would add in a manner that results in constructive interference. More specifically, when beams of light from different paths have the same optical path lengths and the same polarization orientation and are imaged onto the same part of a retina of a human eye, the light constructively interferes and intensity is equal to the scalar sum of the beams.

For various reasons, the path lengths of light following different pathways from the input-coupler 112 to a same location on the intermediate-component 114 will actually be different, which can result in (total or partial) destructive interference, which causes the intensity of the light to diminish when imaged by a user's eye. This can occur, for example, because grating properties (e.g., grating depths) of the intermediate-component 114 may be purposely modulated in order to diffract a substantially same amount of light in the horizontal direction over an entirety of the intermediate-component 114. In a region of the intermediate-component closest to the input-coupler, a relatively small amount of light is preferably diffracted downward towards the output-coupler 116. Within the intermediate-component 114, as the distances increase from the input-coupler 112, the amount of light diffracted downward from the intermediate-component 114 towards the output-coupler 116 should gradually increase (e.g., by increasing the efficiency of the intermediate-component 114), because the amount of light still propagating sideways away from the input-coupler 112 gradually decreases with increases in distance from the input-coupler 112. This gradual change in the physical properties of the gratings of the intermediate-component 114 causes different phase shifts at the locations of the intermediate-component 114 where light traveling different pathways combine. Further, due to mechanical tolerances between the different pathways, the path length of the light following different pathways to a same location (on the intermediate-component 114) may be different, which, as noted above, can result in (total or partial) destructive interference. When beams of light from different paths have different optical path lengths and are imaged onto the same part of a retina of a human eye, the light destructively interferes and intensity is less than the scalar sum of the beams. Such destructive interference can cause dark fringes, and more generally, can cause a non-uniform intensity distribution in the light that eventually reaches the output-coupler 116 and exits the waveguide 100. More generally, the multiple-loop interference, if not compensated for, can cause variations in intensity that would be perceptible to a human eye viewing an image that is replicated using the waveguide, which is undesirable.

Depending on the orientation of the various components 112, 114 and 116 of the waveguide, these components may diffract light of incident polarization at different intensities. For example, there can be an approximately five-to-one (i.e., ~5:1) difference between orthogonal horizontal and vertical diffraction efficiency. If the incident polarization is not optimized for specific grating line orientations of the various components 112, 114 and 116 at certain angles, diffraction efficiency can suffer, which can cause dark areas to occur in an image that is replicated using the waveguide and being viewed by a human eye, which is undesirable.

The polarization of light specifies the orientation of the plane that the light wave's electric field oscillates in. Explained another way, the polarization of light is the state of its electric field vector (e-vector) orientation. Light can, for example, be non-polarized (a completely disordered, chaotic orientation of the e-vector), linearly polarized (e-vector oscillates in a plane that is constant), circularly polarized, or elliptical polarized. Linearly polarized light can be, e.g., horizontally polarized light or vertically polarized light, but is not limited thereto. The type of polarization that is ideal in an imaging system depends on many factors, including, e.g., the types and orientations of the components 112, 114 and 116. For a specific example, referring briefly back to FIG. 1A, assume that each of the components 112, 114 and 116 is an SRG type DOE that including grating lines. Further, assume that the input-coupler 112 includes vertical grating lines, and intermediate-component 114 includes 45 degree (diagonal) grating lines, and the output-coupler includes horizontal grating lines. In such an imaging system, the light that is incident on the input-coupler 112 would ideally be vertically polarized; the intermediate-component 114 would ideally rotate the polarization of the light by precisely 90 degrees (so that it becomes horizontally polarized); and that light when incident on the output-coupler 116 (where it is out coupled from the waveguide 100) would ideally be horizontally polarized. However, this is not what would typically occur. The intermediate-component 114 (e.g., gratings thereof) will cause a majority of the polarization rotation, but TIR also causes an angularly-dependent polarization rotations. Further, the input-coupler 112 and output-coupler 116 can also cause some undesired polarization rotation. In other words, in such an implementation the intermediate-component 114 does not simply rotate the polarization of all the light that it diffracts by precisely 90 degrees, and thus, this results in a polarization non-uniformity across the output-coupler 116.

The exemplary waveguide 100 shown in and described with reference to FIGS. 1-4 is for use in an imaging system that relies on pupil replication. In such systems, i.e., systems that rely on pupil replication, the output pupils are preferably uniformly overlapping for all angles. When this is not the case, e.g., because pupils are spaced too far apart from one another, angular-dependent spatial-non-uniformities in intensity arise, which manifest themselves as bright and dark image artifacts, which are undesirable.

Figure 5A:
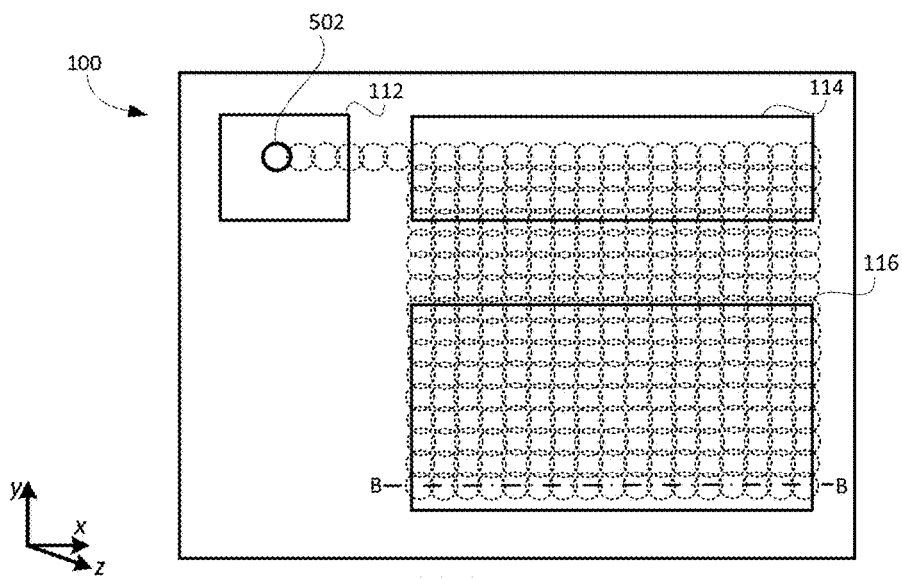
FIG. 5A is used to conceptually illustrate how a pupil is replicated within a waveguide.

FIG. 5A is used to conceptually illustrate how a pupil, represented by the solid-lined circle 502, is replicated, as light travels by way of TIR from the input-coupler 112 to the intermediate-component 114, and by way of TIR from the intermediate-component 114 to the output-coupler 116, where it exits the waveguide 100. In FIG. 5A, each of the dotted-lined circles represents a replication of the pupil 502, which may also be referred to simply as a pupil. While represented as circles in FIG. 5A, each pupil is actually a collection of angles. When light exits the waveguide 100, proximate the output-coupler 116, a human eye, which has a lens in it, receives the collection of angles associated with a pupil and coverts it back to an image, e.g., the image produced by the display engine 204 in FIG. 2. Where the waveguide 100, and more specifically the components 114 and/or 116 thereof is/are configured to perform pupil expansion, when an expanded pupil and is converted to an image (by the lens of a human eye), the resulting image is expanded relative to the original image (e.g., produced by the display engine 204 in FIG. 2).

Figure 5B:
FIG. 5B illustrates an exemplary pupil distribution along the line B-B shown in FIG. 5A.
Figure 5C:
FIG. 5C illustrates an alternative pupil distribution, corresponding to a situation where there is no pupil overlap between pupils replicated within a waveguide.
Figure 5D:
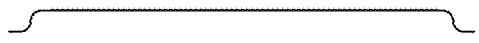
FIG. 5D illustrates a substantially uniform pupil distribution.

FIG. 5B conceptually illustrates an exemplary pupil distribution along the dashed line B-B shown in FIG. 5A, which pupil distribution is shown as having a generally sinusoidal function, due to each pupil have a Gaussian intensity distribution and adjacent pupils only slightly overlapping one another. If the pupils were so spread apart that they did not overlap at all, and each of the pupils had a top-hat intensity distribution, then the pupil distribution can potentially have a square wave function, e.g., as shown in FIG. 5C, although a sinusoidal function (an example of which is shown in FIG. 5B) is more likely. Pupil distributions having a sinusoidal or square wave function will manifest themselves as bright and dark image artifacts, which are undesirable. Optimally, the pupils will overlap one another to achieve a uniform pupil distribution, which provides for a uniform intensity distribution function, as shown in FIG. 5D, which can be achieved, e.g., if there was a 50% overlap between pupils. More generally, there is a desire to homogenize pupil overlap to provide a substantially uniform pupil distribution in the light traveling within the waveguide that is incident on the output-coupler 116.

Figure 6:
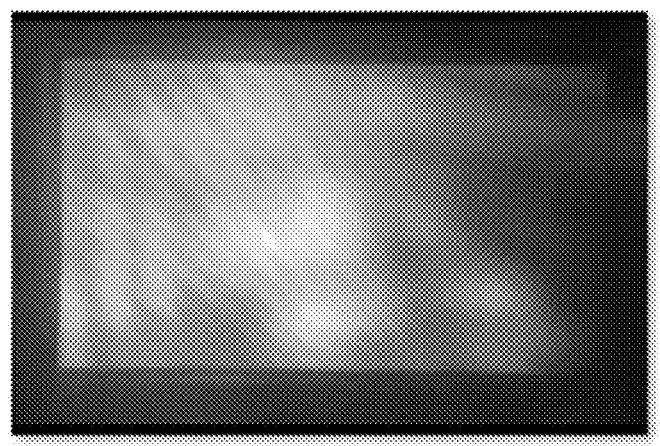
FIG. 6 is used to illustrate non-uniformities in local and global intensities which may occur when performing imaging, and more specifically pupil replication, using an optical waveguide.

FIG. 6 is used to illustrate that non-uniformities in local and global intensity which may occur when performing imaging using an optical waveguide, wherein the non-uniformities can occur due to multiple-loop interference, non-optimal polarization and/or non-uniform pupil distribution. More specifically, the dark and light generally diagonal fringes are illustrative of non-uniformities in local intensity that occur do to the pupil distribution being non-uniform, and the dark blotches (shown primarily on the right side) are illustrative of non-uniformities in local intensity that occur due to multiple-loop interference.

Embodiments of the present technology, which are described below, can be used to compensate for multiple-loop interference, provide for more optimized polarization and/or provide for a more uniform pupil distribution. More generally, embodiments of the present technology, which are described below, are utilized to cause the light that is output from a waveguide (e.g., 100) by an output-coupler (e.g., 116) to have a more uniform intensity distribution, so that any non-uniformity in intensity is imperceptible to a human eye viewing an image using the waveguide.

More generally, embodiments of the present technology described herein are used to achieve a substantially uniform intensity distribution in the light that exits a waveguide (e.g., 100) via an output-coupler (e.g., 116). A substantially uniform intensity distribution can be a substantially uniform angular intensity distribution, or a substantially uniform spatial intensity distribution, depending upon implementation. It is also possible that substantially uniform intensity distribution can be both a substantially uniform angular intensity distribution, and a substantially uniform spatial intensity distribution. A substantially uniform angular intensity distribution is especially beneficial in applications where the location of a user's eye(s) is/are fixed relative to the waveguide(s), e.g., in a head-mounted-display (HMD) or other near-eye-display (NED) application. A substantially uniform spatial intensity distribution is especially beneficial in applications where the location of a user's eye(s) is/are not fixed relative to the waveguide(s), e.g., in a heads-up-display (HUD) application. The overall goal of having the light, output by the waveguide, having a substantially uniform intensity distribution is so that any non-uniformity in intensity is imperceptible to a human eye viewing an image using the waveguide.

Without using embodiments of the present technology, or alternative techniques for compensating for non-uniform intensity distributions, the light that is output from a waveguide by an output-coupler will have a non-uniform intensity distribution that would be very noticeable to a human eye viewing an image that is reproduced using the waveguide. More specifically, certain portions of an image would appear significantly brighter than other portions, and certain portions of the image would appear significantly darker than other portions. An example of this can be appreciated from FIG. 6, discussed above.

The interference loops, which occur within an intermediate-component (e.g., 114), and which were described above with reference to FIG. 4, cause strong interference and are sensitive to manufacturing variations. Where the grating period over the intermediate-component (e.g., 114) is constant, which is typically the case, the optical path difference between the different parts of each of the interference loops is on the order of nanometers. This is within the coherent length of any potential LED light source, and therefore, the interference cannot be reduced by reducing the coherence length of the light, where the illuminator 210 includes one or more LED light sources. Further, the optical paths cannot be altered to go beyond the coherence length. Nevertheless, even though coherence cannot be reduced in the intermediate-component, it can instead be reduced by the input-coupler. In accordance with certain embodiments of the present technology, by including in-coupling elements in or on both major surfaces of an optical waveguide and coupling light in a same direction (or in multiple different directions), the coherence can be reduced if the thickness of the waveguide is larger than the coherence length of the light. The light beams coupled by the in-coupling elements in or on the opposite major surfaces of the optical waveguide are not correlated and cannot interfere with each other. This can be extended by the input-coupler coupling light in several different directions, and then bringing the light back together with different intermediate-components. For example, if light is diffracted in three different directions by each diffraction grating of a double sided diffraction grating of an input-coupler, six different uncorrelated light beams are introduced and reduce the interference a great deal. However, it is noted that where the illuminator 210 includes laser light sources, instead of LEDs, the thickness of the waveguide will likely be much less than the coherence length of light.

The exemplary optical waveguide 100 described above with reference to FIGS. 1A-1C and other FIGS. was described as including an input-coupler 112, an intermediate-component 114 and an output-coupler 116. The input-coupler 112 was described as being configured to couple light corresponding to an image, which is incident on the input-coupler, into the bulk-substrate and to diffract light towards the intermediate-component 114. The intermediate-component was described as being configured to perform horizontal pupil expansion and to direct light corresponding to the image towards the output-coupler 116. The output-coupler 116 was described as being configured to perform vertical pupil expansion and couple light corresponding to the image out of the waveguide so that the image is viewable from an output-pupil. It was also noted above, that the layout of the optical waveguide can be modified such that the intermediate-component performs vertical pupil expansion and the output-coupler performs horizontal pupil expansion.

When performing pupil expansion (e.g., either horizontal or vertical, but not limited thereto), the intermediate-component can utilize so called "odd-order" pupil expansion, or "even-order" pupil expansion. With odd-order expansion, as the term is used herein, light that interacts with the intermediate-component transitions one or more times between a zero-order diffraction mode and a first-order diffraction mode, such that light changes its propagation direction an odd number of times (e.g., 1, 3, 5, etc.) by the time the light is incident on the output-coupler. With even-order expansion, as the term is used herein, light that interacts with the intermediate-component transitions zero or more times between a zero-order diffraction mode and a first-order diffraction mode, such that the light changes its propagation direction an even number of times (e.g., 0, 2, 4, etc.) by the time the light is incident on the output-coupler. Stated another way, with odd-order pupil expansion, the intermediate-component causes light to change between zero-order and first-order reflections an odd number of times before the light is incident on the output-coupler; and with even-order pupil expansion, the intermediate-component causes light to change between zero-order and first-order reflections an even number of times before the light is incident on the output-coupler.

Figure 7:
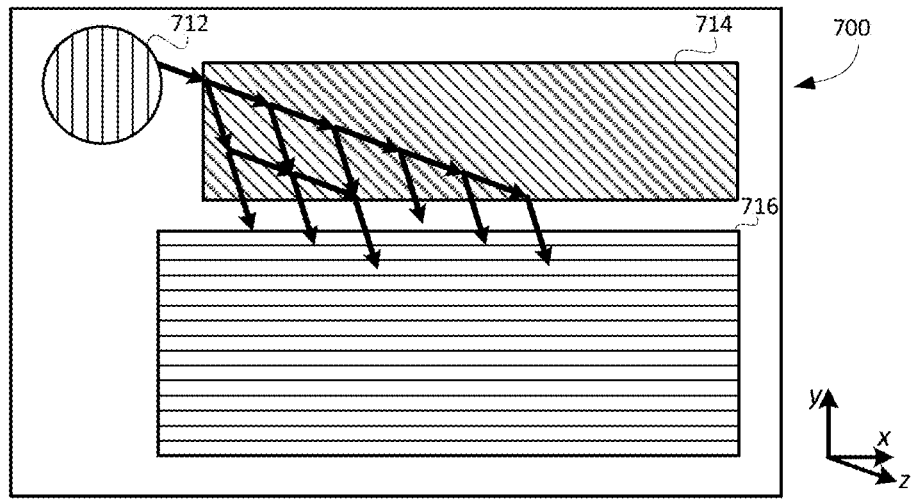
FIG. 7 illustrates an exemplary layout of an optical waveguide including an input-coupler, an intermediate-component, and an output-coupler, where the intermediate-component performs odd-order horizontal pupil expansion.
Figure 8:
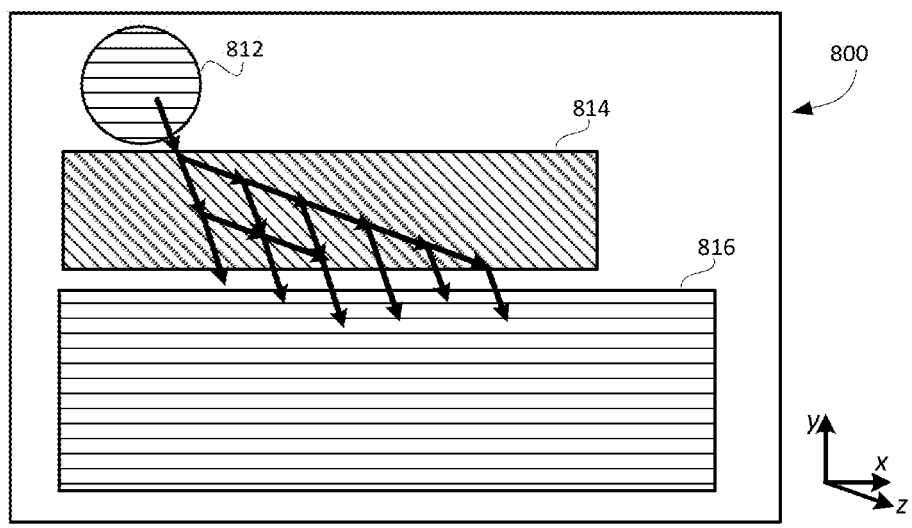
FIG. 8 illustrates an exemplary layout of an optical waveguide including an input-coupler, an intermediate-component, and an output-coupler, where the intermediate-component performs even-order horizontal pupil expansion.

FIG. 7 illustrates an exemplary layout of an optical waveguide 700 including an input-coupler 712, an intermediate-component 714, and an output-coupler 716, where the intermediate-component performs 714 odd-order horizontal pupil expansion. FIG. 8 illustrates an exemplary layout of an optical waveguide 800 including an input-coupler 812, an intermediate-component 814, and an output-coupler 816, where the intermediate-component 714 performs even-order horizontal pupil expansion. In the layout of FIG. 7, in order to cause the intermediate-component 714 to provide odd-order expansion, the intermediate-component 714 is located to the side (to the right in this example, relative to a front view of the waveguide 700) of the input-coupler 712, and the input-coupler 712 is configured to cause light to initially propagate predominantly sideways (albeit at an angle) before propagating predominantly downward (albeit at an angle). In the embodiment of FIG. 7, the input-coupler 712 can be a diffraction grating with vertically arranged grating lines (also known as grooves), but is not limited thereto. In the layout of FIG. 8, in order to cause the intermediate-component 814 to provide even-order expansion, the intermediate-component 814 is located to the below the input-coupler 812 (relative to a front view of the waveguide 800), and the input-coupler 812 is configured to cause light to initially propagate predominantly downward (albeit at an angle) before propagating predominantly sideways (albeit at an angle). In the embodiment of FIG. 8, the input-coupler 812 can be a diffraction grating with horizontally arranged grating lines (also known as grooves), but is not limited thereto.

There are certain advantages to an intermediate-component providing odd-order horizontal pupil expansion, and there are certain advantages to an intermediate-component providing even-order pupil expansion. For example, even-order horizontal pupil expansion is typically more robust than odd-order horizontal pupil expansion, because the propagation angle of light diffracted from the intermediate-component (e.g., 814) to the output-coupler (e.g., 816), is the same as the original propagation angle of light diffracted from the input-coupler (e.g., 812) to the intermediate-component (e.g., 814), as can be appreciated from FIG. 8. This enables grating period tolerances to be significantly larger (e.g., about 1000×) for an intermediate-component providing even-order pupil expansion, compared to an intermediate-component providing odd-order pupil expansion. On the other hand, an intermediate-component providing even-order pupil expansion may be more applicable for a specific layout where there is a limited overall size of the waveguide. For example, it can be appreciated from a comparison of FIGS. 7 and 8 that more of overall area of the waveguide 700 in FIG. 7 is occupied by optical components (i.e., 712, 714 and 716), compared to the waveguide 800 in FIG. 8.

Figure 9:
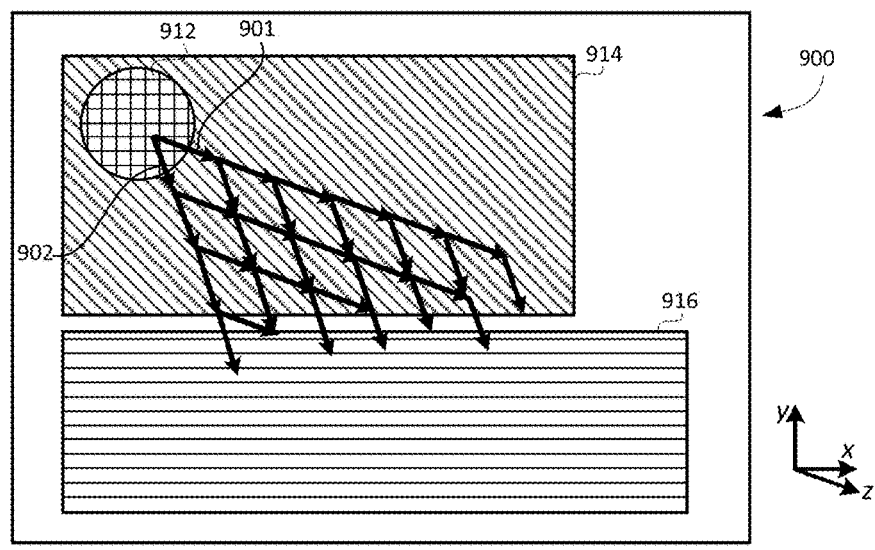
FIG. 9 illustrates an optical waveguide, according to an embodiment of the present technology, wherein the optical waveguide includes an input-coupler, an intermediate-component, and an output-coupler, where the intermediate-component performs both odd-order pupil expansion and even-order pupil expansion.

In accordance with certain embodiments of the present technology, the input-coupler and the intermediate-component of an optical waveguide are each individually appropriately configured, and are positioned relative to one another, such that the intermediate-component performs both odd-order pupil expansion and even-order pupil expansion in a same direction (e.g., a horizontal direction). An example of such an embodiment is shown in FIG. 9. Referring to FIG. 9, shown therein is an optical waveguide 900 including an input-coupler 912, an intermediate-component 914, and an output-coupler 916, where the intermediate-component performs 914 both odd-order pupil expansion and even-order pupil expansion in a same direction (e.g., a horizontal direction), and the output-coupler performs pupil expansion in another direction (e.g., a vertical direction). In order to achieve this, the input-coupler 912 is configured to diffract a first portion of light (corresponding to an image) that is incident on the input-coupler 912 in a first direction that is represent by arrowed line 901, and diffract a second portion of the light (corresponding to the image) that is incident on the input-coupler 912 in a second direction that is represented by the arrowed line 902. In FIG. 9, the first direction is predominantly sideways (albeit at an angle), and the second direction is predominantly downward (albeit at an angle). The light coupled into a waveguide (e.g., 900) by an input-coupler (e.g., 912) can also be referred to as an input-beam, the light diffracted by the input-coupler in the first and second directions can also be referred to as first and second sub-beams, and the light coupled out of the waveguide by an output-coupler (e.g., 916) can also be referred to as an output-beam.

Still referring to FIG. 9, the light that is initially diffracted in the first direction represented by the arrowed line 901 will experience odd-order horizontal pupil expansion by the intermediate-component 914. The light that is initially diffracted in the second direction represented by the arrowed line 902 will experience even-order horizontal pupil expansion by the intermediate-component 914. Stated another way, the intermediate-component 914 performs odd-order pupil expansion on a first portion of the light it receives from the input-coupler 912, and even-order pupil expansion on a second portion of the light it receives from the input-coupler 912. The intermediate-component 914 diffracts both the first portion of the light and the second portion of the light toward the output-coupler 916. The output-coupler 916 performs pupil expansion and out-couples (e.g., diffracts) the light incident thereon out of the output-coupler 916 so that the light (corresponding to the image, initially in-coupled by the input-coupler 912) is viewable from an output-pupil, wherein the output-pupil is expanded relative to an input-pupil. The pupil expansion performed by the output-coupler 916 can be orthogonal to the pupil expansion performed by the intermediate-component 914, but that need not be the case in all implementations.

In the embodiment described with reference to FIG. 9, light that experiences odd-order pupil expansion by the intermediate-component 914 will travel different path lengths and/or have different polarization rotations than light that experiences even-order pupil expansion by the intermediate-component 914. This will have the effect of providing for wave front phase and/or polarity diversity that can provide for a uniform wave front phase and/or polarity distribution of the light by the time the light is incident on the output-coupler 916. There are various different ways to configure the input-coupler 912 to diffract light in two different directions, so that some of the light experiences odd-order pupil expansion by the intermediate-component 914, and other light experiences even-order pupil expansion by the intermediate-component 914, as will be described below discussion.

Figure 10:
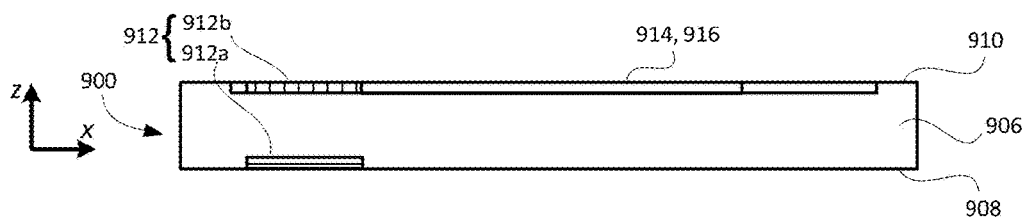
FIG. 10 is a top view of the optical waveguide of FIG. 9, according to a specific embodiment of the present technology, wherein the input-coupler is implemented as a double-sided grating.

In accordance with certain embodiments, described with reference to FIG. 10, the input-coupler 912 is implemented as a double sided diffraction grating, wherein FIG. 10 is an exemplary top view of the optical waveguide 900 introduced in FIG. 9, according to an embodiment. Referring to FIG. 10, the optical waveguide 900 is shown as including a bulk-substrate have a first major surface 908 and a second major surface 910 opposite and parallel to the first major surface 908. As can be seen in FIG. 10, the input-coupler 912 includes a first diffraction grating 912a in or on the first major surface 908 of the bulk-substrate 906 of the optical waveguide 900, and a second diffraction grating 912b in or on the second major surface 910 of the bulk-substrate 906 of the optical waveguide 900.

In accordance with an embodiment, the first diffraction grating 912a is implemented in or on the first major surface 908, and the second diffraction grating 912b is implemented in or on the second major surface 910. In accordance with an embodiment, the first diffraction grating 912a of the input coupler 912 includes a first set of grating lines (also known as grooves), and the second diffraction grating 912b of the input coupler includes a second set of grating lines, wherein the orientation of the grating lines of the first diffraction grating 912a differs from the orientation of the grating lines of the second diffraction grating 912b. For example, linear grating lines of the second diffraction grating 912b can be orthogonal to (i.e., rotated 90 degrees relative to) linear grating lines of the first diffraction grating 912a. For a more specific example, when viewing the optical waveguide from the front view shown in FIG. 10, the linear grating lines of the first diffraction grating 912a can be vertically oriented (resembling the grating lines of the input-coupler 712 shown in FIG. 7), and the linear grating lines of the second diffraction grating 912b can be horizontally oriented (resembling the grating lines of the input-coupler 812 shown in FIG. 8). It is also possible that the linear grating lines of the second diffraction grating 912b are rotated at some other angle, other than 90 degrees, relative to the linear grating lines of the first diffraction grating 912a. It is also noted that none of the grating lines need by horizontally or vertically oriented, but rather, can be at other angles. These are just a few examples, which are not intended to encompass all possibilities.

Rather than implementing the input-coupler 912 as a double sided diffraction grating, with the linear grating lines of the diffraction gratings on different major sides of bulk-substrate being rotated relative to one another, the input-coupler 912 can be implemented as a single sided diffraction grating having a first set of linear grating lines rotated relative to a second set of linear grating lines. For example, the second set of linear grating lines of the input-coupler 912 can be orthogonal to (i.e., rotated 90 degrees relative to) the first set of linear grating lines of the input-coupler 912, such that the first and second set of grating lines of the input-coupler 912 would have a waffle pattern or crisscross pattern. More specifically, when viewing the optical waveguide from the front view shown in FIG. 9, the first set of linear grating lines of the input coupler 912 can be vertically oriented (resembling the grating lines of the input-coupler 712 shown in FIG. 7), and the linear grating lines of the second diffraction grating 912b can be horizontally oriented (resembling the grating lines of the input-coupler 812 shown in FIG. 8). It is also possible that the first and second set of linear grating lines of the single sided input-coupler 912 be rotated at some other angle, other than 90 degrees, relative to one another. Such an input-coupler 912 can be implemented as an SRG, but is not limited thereto.

In certain embodiments, the input-coupler 912, rather than having groove type gratings, can have a periodic array or pattern of pillar gratings that are configured to diffract a first portion of light that is incident on the input-coupler 912 in a first direction (e.g., represent by arrowed line 901 in FIG. 9), and diffract a second portion of the light that is incident on the input-coupler 912 in a second direction (e.g., represented by the arrowed line 902 in FIG. 9), so that the intermediate-component 914 performs odd-order horizontal pupil expansion on the first portion of the light it receives from the input-coupler 912, and even-order horizontal pupil expansion on the second portion of the light it receives from the input-coupler 912. In still other embodiments, the input-coupler 912 can include a periodic array or pattern of dots or holes, instead of the aforementioned pillar gratings or the aforementioned groove type gratings. It is also possible that the input-coupler 912 can include a combination of two or more of the above described types of gratings (e.g., a combination of groove type gratings, pillar gratings and/or an dot or hole type gratings). Other variations are possible and within the scope of the embodiments described herein.

In accordance with specific embodiments, the input-coupler 912 can be a crossed-grating, which is a grating that is periodic in two, orthogonal or non-orthogonal, directions that are parallel to the major surfaces of the waveguide. The periods in these two directions can be equal or different. The pillar and hole gratings, mentioned above, are special cases of crossed-gratings. A crossed-grating type of input-coupler 912 can alternatively be an index-modulated crossed-grating, or can have a permittivity tensor that is periodically modulated in two directions (e.g. polarization gratings), or can have two-dimensional photonic crystals, but is not limited thereto.

In the above described embodiments, each of the intermediate-components were described as performing horizontal pupil-expansion, and each of the output-couplers were described as performing vertical pupil expansion. It is also within the scope of embodiments of the present technology to reposition the various optical components relative to one another and configure the optical components such that intermediate-components performed vertical pupil-expansion, and output-couplers performed horizontal pupil-expansion. More generally, an intermediate-component of an optical waveguide can be configured to perform one of horizontal or vertical pupil-expansion, and an output-coupler of the optical waveguide can be configured to perform the other one of the horizontal or vertical pupil-expansion. Even more generally, an intermediate-component of an optical waveguide can be configured to perform pupil-expansion in one direction, and an output-coupler of the optical waveguide can be configured to perform pupil-expansion in another direction, which may (or may not) be orthogonal to the direction of pupil-expansion performed by the intermediate-component.

In the above described FIGS. and embodiments, each of the optical waveguides was shown and described as including a single intermediate-component. In the embodiments described with reference to FIGS. 9 and 10, the same intermediate-component 914 was described as performing both odd-order pupil expansion and even-order pupil expansion. In alternative embodiments, an optical waveguide can include two or more intermediate-components, with at least one of the intermediate-components positioned and configured to perform odd-order pupil expansion, and at least one other intermediate-component positioned and configured to perform even-order pupil expansion. Examples of such alternative embodiments will now be described with reference to FIGS. 11 and 12.

Figure 11:
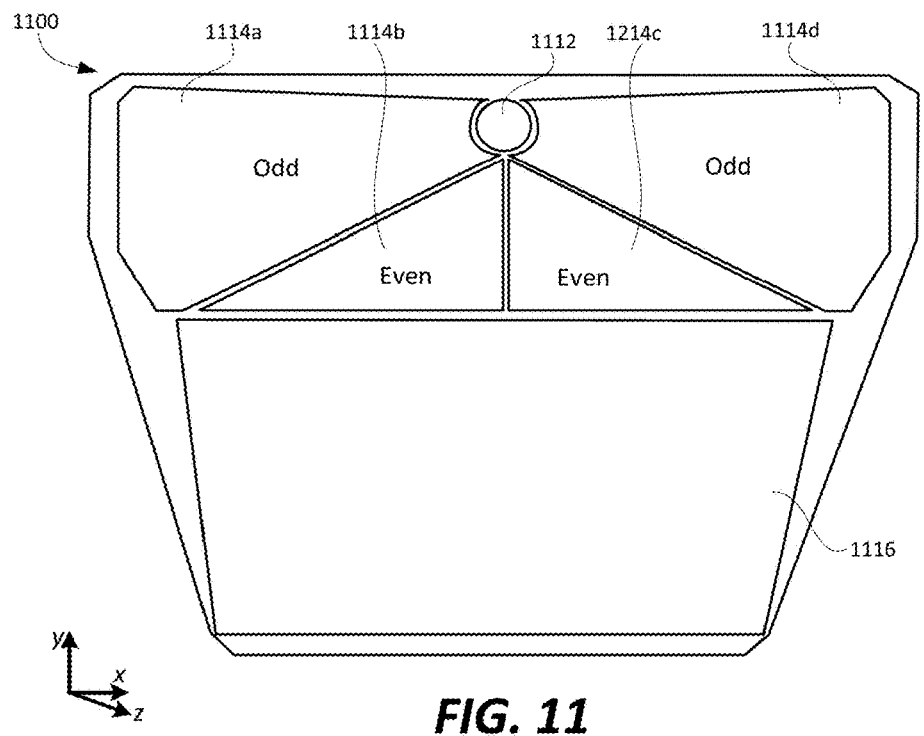
FIG. 11 illustrates an optical waveguide, according to an embodiment of the present technology, wherein the optical waveguide includes an input-coupler, four intermediate-components, and an output-coupler, where two of the intermediate-components perform odd-order pupil expansion, and the other two of the intermediate-components perform even-order pupil expansion.

Referring to FIG. 11, an optical waveguide 1100 is shown as including an input-coupler 1112, four intermediate-components 1114a, 1114b, 1114c and 1114d, and an output-coupler 1116. The input-coupler 1112 includes one or more diffraction gratings and is configured to couple light corresponding to an image associated with an input-pupil, and having a corresponding field-of view (FOV), into the optical waveguide 1100. The input-coupler 1114a is also configured to diffract a portion of the light corresponding to the image in a first direction toward the intermediate-component 1114a such that a first portion of the FOV travels through the optical waveguide 1100 from the input-coupler 1112 to the intermediate-component 1114a, diffract a portion of the light corresponding to the image in a second direction toward the intermediate-component 1114b such that a second portion of the FOV travels through the optical waveguide 1100 from the input-coupler 1112 to the intermediate-component 1114b, diffract a portion of the light corresponding to the image in a third direction toward the intermediate-component 1114c such that a third portion of the FOV travels through the optical waveguide 1100 from the input-coupler 1112 to the intermediate-component 1114c, and diffract a portion of the light corresponding to the image in a fourth direction toward the fourth intermediate-component 1114d such that a fourth portion of the FOV travels through the optical waveguide 1100 from the input-coupler 1112 to the intermediate-component 1114d.

In the embodiment of FIG. 11, the portion of the FOV provided to the intermediate-component 1114a differs from the portion of the FOV provided to the intermediate-component 1114d, and the portion of the FOV provided to the intermediate-component 1114b differs from the portion of the FOV provided to the intermediate-component 1114c. Depending upon implementation, the portion of the FOV provided to the intermediate-component 1114b may be the same as or different that the portion of the FOV provided to the intermediate component 1114a; and the portion of the FOV provided to the intermediate-component 1114c may be the same as or different that the portion of the FOV provided to the intermediate component 1114d. In accordance with an embodiment, the grating period of the input-coupler 1112 is tuned so that part of the FOV that is not to be steered to either of the intermediate-components 1114a and 1114d goes to an evanescent diffraction order that does not carry any power.

In the embodiment of FIG. 11, each of the intermediate components 1114a and 1114d is configured to perform odd-order horizontal pupil expansion, and diffract light having a respective portion of the original FOV toward the output-coupler 1116; and the intermediate components 1114b and 1114c are configured to perform even-order horizontal pupil expansion, and diffract light having a respective portion of the original FOV toward the output-coupler 1116. The output-coupler 1116 is also configured to combine the FOVs and couple the light corresponding to the combined FOVs out of the optical waveguide 1100 so that the light corresponding to the image and the combined FOVs is output from the optical waveguide 1100 and viewable from an output-pupil.

In accordance with certain embodiments, the input-coupler 1112 is implemented as a diffraction grating in or on only one of the major surfaces of the waveguide 1100. Such a diffraction grating can include a first set of linear grating lines, and second set of linear grating lines that are rotated at an angle relative to first set of linear grating lines. For example, the angle can be ninety degrees, in which case the second set of linear grating lines of the diffraction grating of the input-coupler would be orthogonal to the first set of linear grating lines of the diffraction grating of the input-coupler. In an embodiment, the line spacing of the first set of linear grating lines are constant, but the slant angle of a first half the first set of linear grating lines is optimized to direct a portion of the light incident on the input-coupler 1112 in the direction of the intermediate-component 1114a, and the slant angle of a second half the gratings is optimized to direct a portion of the light incident on the input-coupler 1112 in the direction of the intermediate-component 1114b. The second set of linear grating lines can similarly be optimized to direct a portion of the light incident on the input-coupler 1112 in the direction of the intermediate-component 1114b, and direct a portion of the light incident on the input-coupler 1112 in the direction of the intermediate-component 1114c.

In accordance with other embodiments, the input-coupler 1112 is implemented as a diffraction grating in or on both of the major surfaces of the waveguide 1100. In one such embodiment, a first diffraction grating is located in or on one the major surfaces of the optical waveguide 1100 and is configured to diffract light toward the intermediate-component 1114a, and diffract light toward the intermediate component 1114b; and a second diffraction grating is located in or on the other one of the major surfaces of the optical waveguide 1100 and is configured to diffract the light toward the intermediate-component 1114d, and diffract light toward the intermediate-component 1114c. One of ordinary skill in the art reading the description herein would appreciated that other variations are possible, and within the scope of the embodiments described herein.

Figure 12:
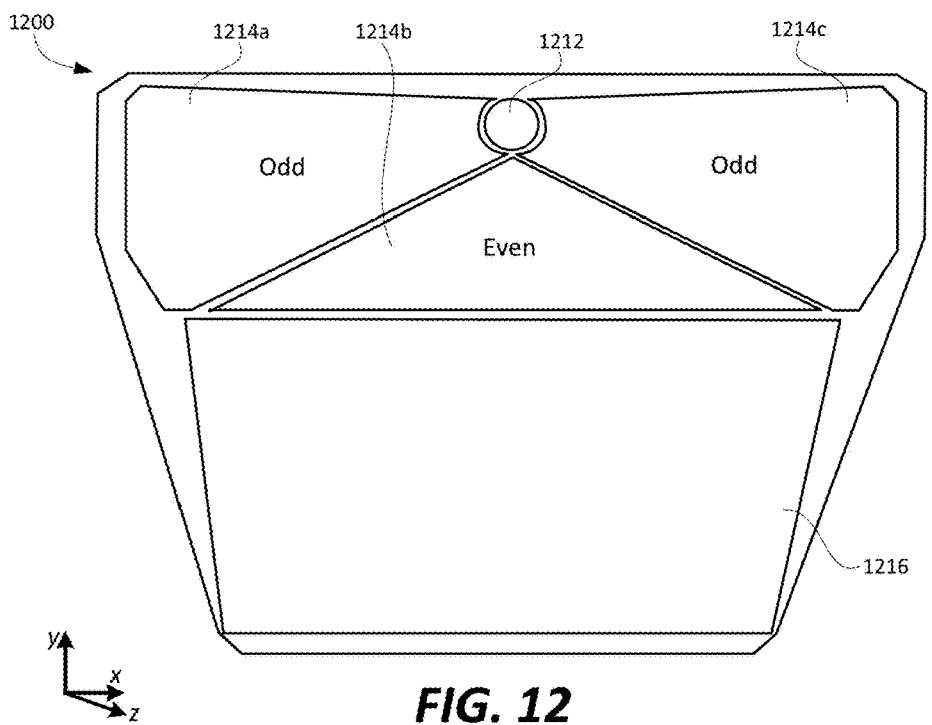
FIG. 12 illustrates an optical waveguide, according to an embodiment of the present technology, wherein the optical waveguide includes an input-coupler, three intermediate-components, and an output-coupler, where two of the intermediate-components perform odd-order pupil expansion, and the other one of the intermediate-components performs even-order pupil expansion.

Referring to FIG. 12, an optical waveguide 1200 is shown as including an input-coupler 1212, three intermediate-components 1214a, 1214b and 1214c, and an output-coupler 1216. The input-coupler 1212 includes one or more diffraction gratings and is configured to couple light corresponding to an image associated with an input-pupil, and having a corresponding FOV, into the optical waveguide 1200. The input-coupler 1214a is also configured to diffract a portion of the light corresponding to the image in a first direction toward the first intermediate-component 1214a such that a first portion of the FOV travels through the optical waveguide 1200 from the input-coupler 1212 to the first intermediate-component 1214a, diffract a portion of the light corresponding to the image in a second direction toward the second intermediate-component 1214b such that a second portion of the FOV travels through the optical waveguide 1200 from the input-coupler 1212 to the second intermediate-component 1214b, and diffract a portion of the light corresponding to the image in a third direction toward the third intermediate-component 1214c such that a third portion of the FOV travels through the optical waveguide 1200 from the input-coupler 1212 to the third intermediate-component 614c.

In the embodiment of FIG. 12, the portion of the FOV provided to the intermediate-component 1214a differs from the portion of the FOV provided to the intermediate-component 1214c. The portion of the FOV provided to the intermediate-component 1214b can include part of the FOV provided to the intermediate-component 1214a and part of the FOV provided to the intermediate-component 1214c. The portion of the FOV provided to the intermediate-component 1214b can alternatively be distinct from the portion of the FOV provided to the intermediate-component 1214a and portion of the FOV provided to the intermediate-component 1214c. In accordance with an embodiment, the grating period of the input-coupler 1212 is tuned so that part of the FOV that is not to be steered to either of the intermediate-components 1214a and 1214c goes to an evanescent diffraction order that does not carry any power.

In the embodiment of FIG. 12, each of the intermediate components 1214a and 1214c is configured to perform odd-order horizontal pupil expansion, and diffract light having a respective portion of the original FOV toward the output-coupler 1216; and the intermediate component 1214b is configured to perform even-order horizontal pupil expansion, and diffract light having a respective portion of the original FOV toward the output-coupler 1216. The output-coupler 1216 is also configured to combine the FOVs and couple the light corresponding to the combined FOVs out of the optical waveguide 1200 so that the light corresponding to the image and the combined FOVs is output from the optical waveguide 1200 and viewable from an output-pupil.

While not specifically shown in all of the above described figures (FIGS. 9-12), each of the optical waveguides (e.g., 700, 800, 900, 1100 and 1200) is for use with a display engine, which can be the same as or similar to the display engine 204 described above with reference to FIG. 2, but is not limited thereto. For example, the display engine (e.g., 204) can face a back-side surface of one of the optical waveguides, and a user's eye (e.g., the eye of a person wearing HMD glasses) can facing a front-side surface opposite and parallel to the back-side surface, to provide for a periscope type of configuration in which light enters the waveguide on one side of the waveguide, and exits the waveguide at an opposite side of the waveguide. Alternatively, the input-coupler and the output-coupler can be implemented in a manner such that the display engine and a user's eye are proximate to and face a same major surface of the optical waveguide.

Where optical waveguides are used to perform pupil replication (also referred to as image replication), non-uniformities in local and global intensities may occur, which may result in dark and light fringes and dark blotches when the replicated image is viewed, which is undesirable. The embodiments shown in and described with reference to FIGS. 9, 10, 11 and 12 provide for improved intensity distributions, and thereby, can be used to improve the replicated image when viewed, compared to the embodiments shown in and described with reference to FIGS. 1, 3, 5A, 7 and 8.

In the embodiments described herein, each of the diffraction gratings, instead of being a surface grating, can alternatively be a volume grating, such as a Bragg diffraction grating. It is also possible that one or more of the couplers are manufactured as SRGs and then covered within another material, e.g., using ab atomic layer deposition process or an aluminium deposition process, thereby essentially burying the SRGs such that the major planar waveguide surface(s) including the SRG(s) is/are substantially smooth. Such a coupler is one example of a hybrid of a surface and volume diffraction grating. Any one of the input-coupler, the intermediate-component(s) and the output-coupler of an optical waveguide described herein can be, e.g., a surface diffraction grating, or a volume diffraction grating, or a hybrid of a surface and volume diffraction grating. In accordance with embodiments described herein, each diffraction grating can have a preferential linear polarization orientation specified by a direction of the grating lines of the diffraction grating, wherein the coupling efficiency for light having the preferential linear polarization orientation will be higher than for light having a non-preferential linear polarization orientation.

Using embodiments described with reference to FIGS. 11 and 12, a large FOV of at least 70 degrees, and potentially up to 90 degrees or even larger can be achieved by an optical waveguide that utilizes intermediate-components to provide pupil expansion, even where the intermediate-components individually can only support of FOV of about 35 degrees. Additionally, where only a portion of the total FOV is guided to disparate intermediate-components, a power savings of up to 50% can be achieved when compared to a situation where the FOV is not split by the input-coupler.

The optical waveguides (e.g., 900, 1100, 1200) described herein can be incorporated into a see-through mixed reality display device system. The same waveguide can be used to steer light of multiple different colors (e.g., red, green and blue) associated with an image from the input-coupler to the output-coupler. Alternatively, three waveguides can be stacked adjacent to each other, with each of the waveguides being used to steer light of a different color (e.g., red, green or blue) associated with an image from its respective input-coupler to its output-coupler. It would also be possible that one waveguide handle light of two colors (e.g., green and blue) and another waveguide handles light of a third color (e.g., red). Other variations are also possible.

The optical waveguides (e.g., 900, 1100 or 1200) described herein are for use in steering light from an input-coupler to an output-coupler, where the light is out-coupled for viewing or imaging by one of a person's two eyes (i.e., either their left or right eye). One or more further instances of the waveguide (e.g., 900, 1100 or 1200) can be provided for the other eye. In other words, a separate instance of the waveguide (e.g., 900, 1100 or 1200) and the display engine 204 can be provided for each of the left and right eyes of a user. In certain embodiments, such waveguide(s) may be positioned next to or between see-through lenses, which may be standard lenses used in eye glasses and can be made to any prescription (including no prescription). Where there is a separate waveguide for each of the left and right eyes of a user, there can be a separate display engine for each of the waveguides, and thus, for each of the left and right eyes of the user. One or more further adjacent waveguides can be used to perform eye tracking based on infrared light that is incident on and reflected from the user's eye(s) 214, as is known in the art.

In the above described FIGS., the input-couplers, the intermediate-components and the output-couplers were are shown as having specific outer peripheral shapes, but can have alternative outer peripheral shapes. Similarly, the peripheral shape of the optical waveguides can also be changed, while still being within the scope of embodiments described herein.

Figure 13:
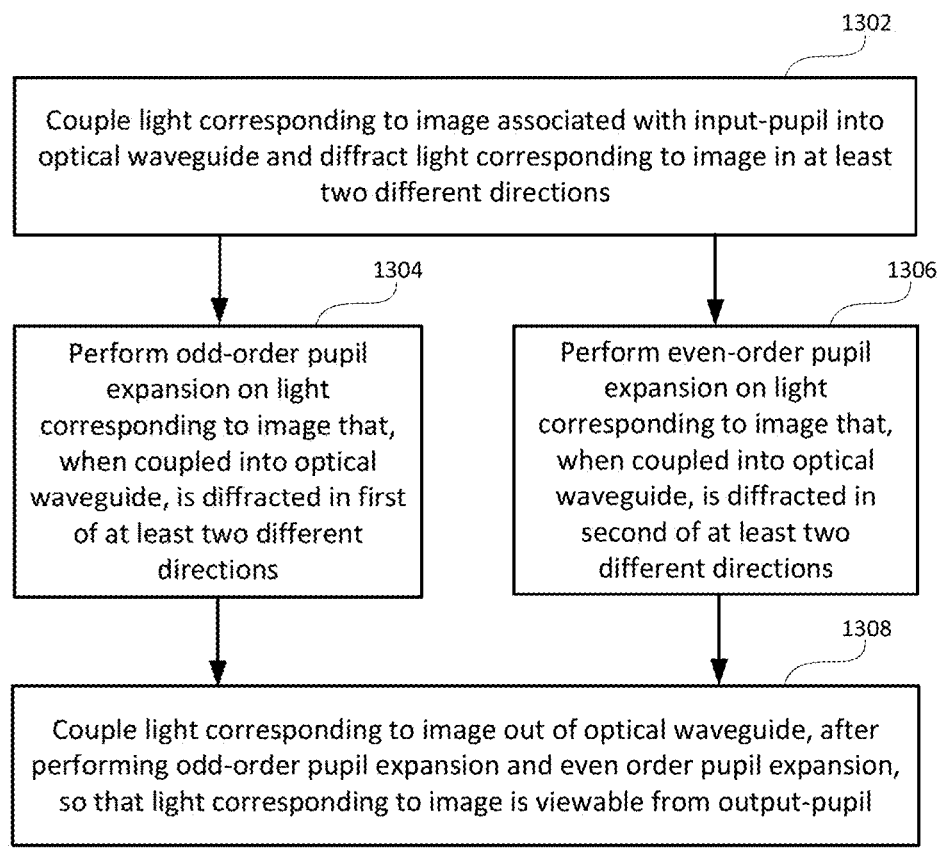
FIG. 13 is a high level flow diagram that is used to summarize methods according to certain embodiments of the present technology.

FIG. 13 is a high level flow diagram that is used to summarize methods according to certain embodiments of the present technology. Such methods use an optical waveguide to replicate an image associated with an input-pupil to an output-pupil. Referring to FIG. 13, step 1302 involves coupling light corresponding to the image associated with the input-pupil into the optical waveguide and diffracting the light corresponding to the image in at least two different directions. Step 1304 involves performing odd-order pupil expansion on light corresponding to the image that, when coupled into the optical waveguide, is diffracted in a first one of the at least two different directions. Step 1306 involves performing even-order pupil expansion on light corresponding to the image that, when coupled into the optical waveguide, is diffracted in a second one of the at least two different directions. Step 1308 involves coupling the light corresponding to the image out of the optical waveguide, after performing the odd-order pupil expansion and the even order pupil expansion, so that the light corresponding to the image is viewable from the output-pupil.

In accordance with certain embodiments, step 1302 is performed using an input-coupler of the optical waveguide. Step 1304 is the performing using an intermediate-component of the optical waveguide. Step 1306 is performing using an intermediate-component of the optical waveguide, which is either the same as or different than the intermediate-component that is used to perform step 1304. The intermediate-component(s) of the optical waveguide, used to perform steps 1304 and 1306, also direct light corresponding to the image towards an output-coupler of the optical waveguide. Step 1308 is performed by the output-coupler of the optical waveguide.

In accordance with certain embodiments, the odd-order and even-order pupil expansion performed by the intermediate-component(s) at steps 1304 and 1308 achieves one of horizontal or vertical pupil expansion. The output-coupler performs the other one of horizontal or vertical pupil expansion.

Certain embodiments described herein are directed to an apparatus for use in replicating an image associated with an input-pupil to an output-pupil. The apparatus can, for example, be part of a head-mounted display (HMD) or a heads-up display (HUD). Such an apparatus can comprise an optical waveguide including input-coupler, one or more intermediate-components and an output-coupler. The input-coupler is configured to couple light corresponding to the image associated with the input pupil into the optical waveguide and diffract the light corresponding to the image in at least two different directions so that light corresponding to the image is diffracted toward each of the one or more intermediate-components. The one or more intermediate-components is/are configured to individually or collectively perform both odd-order pupil expansion and even-order pupil expansion on light corresponding to the image that travels from the input-coupler to the one or more intermediate-components by way of total internal reflection (TIR), and diffract the light corresponding to the image towards the output-coupler. The output-coupler is configured to couple the light corresponding to the image, that has travelled from the one or more intermediate-components to the output-coupler by way of TIR, out of the optical waveguide so that the light corresponding to the image is viewable from the output-pupil.

In accordance with certain embodiments, the one or more intermediate-components of the optical waveguide consists of one intermediate-component. In such an embodiment, the input-coupler is configured to couple light corresponding to the image associated with the input pupil into the optical waveguide and diffract the light corresponding to the image in both a first direction and a second direction both of which are toward the one intermediate-component, wherein the second direction differs from the first direction. The one intermediate-component is configured to perform odd-order pupil expansion on the light corresponding to the image that travels in the first direction from the input-coupler to the one intermediate-component by way of TIR, perform even-order pupil expansion on the light corresponding to the image that travels in the second direction from the input-coupler to the one intermediate-component by way of TIR, and diffract the light corresponding to the image towards the output-coupler. The output-coupler is configured to couple the light corresponding to the image, that has travelled from the one intermediate-component to the output-coupler by way of TIR, out of the optical waveguide so that the light corresponding to the image is viewable from the output-pupil.

In accordance with certain embodiments, the light that is diffracted in the first direction by the input-coupler and experiences odd-order pupil expansion by the one intermediate-component changes propagation direction an odd number of times before being incident on the output-coupler; and the light that is diffracted in the second direction by the input-coupler and experiences even-order pupil expansion by the one intermediate-component changes propagation direction an even number of times before being incident on the output-coupler.

In accordance with certain embodiments, the one or more intermediate-components comprise at least two intermediate-components that are spatially separated from one another. In such embodiments, at least one of the intermediate-components is configured to perform odd-order pupil expansion, and at least another one of the intermediate-components is configured to perform even-order pupil expansion.

In accordance with certain embodiments, a more uniform intensity distribution is achieved by the input-coupler diffracting the light corresponding to the image in at least two different directions so that light corresponding to the image is diffracted toward each of the one or more intermediate-components, and by the one or more intermediate-components individually or collectively performing both odd-order and even-order pupil expansion, compared to if the input-coupler diffracted the light corresponding to the image in only one direction towards only one intermediate-component that performed only one of odd-order or even-order pupil expansion.

In accordance with certain embodiments, both the odd-order pupil expansion and the even-order pupil expansion performed by the one or more intermediate components achieves pupil expansion in a same direction, and the output-coupler is configured to perform pupil expansion in another direction.

In accordance with certain embodiments, the optical waveguide includes a first major surface and a second major surface opposite to the first major surface. In some such embodiments, the input-coupler comprises a first grating that is located in or on one of the first and second major surfaces of the optical waveguide and is configured to diffract the light corresponding to the image in a first direction toward a said intermediate-component. Additionally, the input-coupler comprises a second grating that is located in or on the other one of the first and second major surfaces of the optical waveguide and is configured to diffract the light corresponding to the image in a second direction toward a said intermediate-component. The first grating includes a first set of linear grating lines. The second grating includes a second set of linear grating lines that are rotated at an angle relative to first set of linear grating lines of the first grating. In some such embodiments, the angle is ninety degrees, and thus, the second set of linear grating lines of the second grating are orthogonal to the first set of linear grating lines of the first grating. In some such embodiments, a distance between the first and second major surfaces of the optical waveguide, and thus, between the first and second gratings, is greater than a coherence length of the light corresponding to the image that travels through the optical waveguide by way of TIR.

In accordance with certain embodiments, the input-coupler comprises a grating that is located in or on one of the first and second major surfaces of the optical waveguide. In some such embodiments, the grating of the input-coupler includes a first set of linear grating lines, and second set of linear grating lines that are rotated at an angle relative to first set of linear grating lines. The first set of linear grating lines of the grating of the input-coupler is configured to diffract the light corresponding to the image in a first direction towards a said intermediate-component. The second set of linear grating lines of the grating of the input-coupler is configured to diffract the light corresponding to the image in a second direction towards a said intermediate-component. In some such embodiments, the angle is ninety degrees, and thus, the second set of linear grating lines are orthogonal to the first set of linear grating lines.

In accordance with certain embodiments, the input-coupler comprises a crossed-grating.

Certain embodiments of the present technology relate to methods for using an optical waveguide to replicate an image associated with an input-pupil to an output-pupil. Such a method can comprise coupling light corresponding to the image associated with the input-pupil into the optical waveguide and diffracting the light corresponding to the image in at least two different directions. The method can also include performing odd-order pupil expansion on light corresponding to the image that, when coupled into the optical waveguide, is diffracted in a first one of the at least two different directions; and performing even-order pupil expansion on light corresponding to the image that, when coupled into the optical waveguide, is directed in a second one of the at least two different directions. Additionally, the method can include coupling the light corresponding to the image out of the optical waveguide, after performing the odd-order pupil expansion and the even order pupil expansion, so that the light corresponding to the image is viewable from the output-pupil.

In accordance with certain embodiments, the coupling light corresponding to the image associated with the input-pupil into the optical waveguide and diffracting the light corresponding to the image in at least two different directions is performed using an input-coupler of the optical waveguide. The performing odd-order pupil expansion on light corresponding to the image is performed using an intermediate-component of the optical waveguide. The performing even-order pupil expansion on light corresponding to the image is performed using an intermediate-component of the optical waveguide, which is either the same or different than the intermediate-component that is used for the performing odd-order pupil expansion. The intermediate-component(s) of the optical waveguide also diffract light corresponding to the image towards an output-coupler of the optical waveguide. The coupling the light corresponding to the image out of the optical waveguide, after the intermediate-component(s) perform the odd-order pupil expansion and the even order pupil expansion, is performed by the output-coupler of the optical waveguide.

In accordance with certain embodiments, the odd-order and even-order pupil expansion performed by the intermediate-component(s) achieves pupil expansion in a same direction, and the output-coupler performs pupil expansion in another direction.

Certain embodiments of the present technology are directed to a head-mounted display (HMD) or a heads-up display (HUD) system, comprising a display engine configured to produce an image, and one of the optical waveguides described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for use in replicating an image associated with an input-pupil to an output-pupil, the apparatus comprising:
   an optical waveguide including input-coupler, one or more intermediate-components and an output-coupler;
   the input-coupler configured to couple light corresponding to the image associated with the input pupil into the optical waveguide and diffract the light corresponding to the image in at least two different directions so that light corresponding to the image is diffracted toward each of the one or more intermediate-components;
   the one or more intermediate-components configured to:
      perform odd-order pupil expansion on the light corresponding to the image that travels in the first direction from the input-coupler to the one intermediate-component by way of total internal reflection (TIR);
      perform even-order pupil expansion on the light corresponding to the image that travels in the second direction from the input-coupler to the one intermediate-component by way of TIR; and
   the output-coupler configured to couple the light corresponding to the image, that has travelled from the one or more intermediate-components to the output-coupler by way of TIR, out of the optical waveguide so that the light corresponding to the image is viewable from the output-pupil.

2. The apparatus of claim 1, wherein:
   the one or more intermediate-components of the optical waveguide consists of one intermediate-component;
   the input-coupler is configured to couple light corresponding to the image associated with the input pupil into the optical waveguide and diffract the light corresponding to the image in both a first direction and a second direction both of which are toward the one intermediate-component, wherein the second direction differs from the first direction;
   the one intermediate-component is configured to:
      diffract the light corresponding to the image towards the output-coupler; and
   the output-coupler is configured to couple the light corresponding to the image, that has travelled from the one intermediate-component to the output-coupler by way of TIR, out of the optical waveguide so that the light corresponding to the image is viewable from the output-pupil.

3. The apparatus of claim 1, wherein:
the light that is diffracted in the first direction by the input-coupler and experiences odd-order pupil expansion by the one intermediate-component changes propagation direction an odd number of times before being incident on the output-coupler; and
the light that is diffracted in the second direction by the input-coupler and experiences even-order pupil expansion by the one intermediate-component changes propagation direction an even number of times before being incident on the output-coupler.

4. The apparatus of claim 1, wherein:
the one or more intermediate-components comprise at least two intermediate-components that are spatially separated from one another.

5. The apparatus of claim 1, wherein a more uniform intensity distribution is achieved by the input-coupler diffracting the light corresponding to the image in at least two different directions so that light corresponding to the image is diffracted toward each of the one or more intermediate-components, and by the one or more intermediate-components individually or collectively performing both odd-order and even-order pupil expansion, compared to if the input-coupler diffracted the light corresponding to the image in only one direction towards only one intermediate-component that performed only one of odd-order or even-order pupil expansion.

6. The apparatus of claim 1, wherein both the odd-order pupil expansion and the even-order pupil expansion performed by the one or more intermediate components achieves pupil expansion in a same direction, and wherein the output-coupler is configured to perform pupil expansion in another direction.

7. The apparatus of claim 1, wherein:
the optical waveguide includes a first major surface and a second major surface opposite to the first major surface; and
the input-coupler comprises
a first grating that is located in or on one of the first and second major surfaces of the optical waveguide and is configured to diffract the light corresponding to the image in a first direction toward a said intermediate-component, and
a second grating that is located in or on the other one of the first and second major surfaces of the optical waveguide and is configured to diffract the light corresponding to the image in a second direction toward a said intermediate-component;
the first grating includes a first set of linear grating lines; and
the second grating includes a second set of linear grating lines that are rotated at an angle relative to first set of linear grating lines of the first grating.

8. The apparatus of claim 7, wherein the angle is ninety degrees, and thus, the second set of linear grating lines of the second grating are orthogonal to the first set of linear grating lines of the first grating.

9. The apparatus of claim 7, wherein a distance between the first and second major surfaces of the optical waveguide, and thus, between the first and second gratings, is greater than a coherence length of the light corresponding to the image that travels through the optical waveguide by way of TIR.

10. The apparatus of claim 1, wherein:
the optical waveguide includes a first major surface and a second major surface opposite to the first major surface; and
the input-coupler comprises a grating that is located in or on one of the first and second major surfaces of the optical waveguide;
the grating of the input-coupler including a first set of linear grating lines, and second set of linear grating lines that are rotated at an angle relative to first set of linear grating lines;
the first set of linear grating lines of the grating of the input-coupler is configured to diffract the light corresponding to the image in a first direction towards a said intermediate-component; and
the second set of linear grating lines of the grating of the input-coupler is configured to diffract the light corresponding to the image in a second direction towards a said intermediate-component.

11. The apparatus of claim 10, wherein the angle is ninety degrees, and thus, the second set of linear grating lines are orthogonal to the first set of linear grating lines.

12. The apparatus of claim 1, wherein the input-coupler comprises a crossed-grating.

13. The apparatus of claim 1, wherein the apparatus is part of a head-mounted display (HMD) or a heads-up display (HUD).

14. A method for using an optical waveguide to replicate an image associated with an input-pupil to an output-pupil, comprising:
coupling light corresponding to the image associated with the input-pupil into the optical waveguide and diffracting the light corresponding to the image in at least two different directions;
performing odd-order pupil expansion on light corresponding to the image that, when coupled into the optical waveguide, is diffracted in a first one of the at least two different directions from the input-coupler to the one intermediate-component by way of total internal reflection (TIR);
performing even-order pupil expansion on light corresponding to the image that, when coupled into the optical waveguide, is directed in a second one of the at least two different directions from the input-coupler to the one intermediate-component by way of TIR, which is either the same or different than the intermediate-component that is used for the performing odd-order pupil expansion; and
coupling the light corresponding to the image out of the optical waveguide, after performing the odd-order pupil expansion and the even order pupil expansion, so that the light corresponding to the image is viewable from the output-pupil.

15. The method of claim 14, wherein:
the coupling light corresponding to the image associated with the input-pupil into the optical waveguide and diffracting the light corresponding to the image in at least two different directions is performed using an input-coupler of the optical waveguide;
the intermediate-component(s) of the optical waveguide also diffract light corresponding to the image towards an output-coupler of the optical waveguide; and
the coupling the light corresponding to the image out of the optical waveguide, after the intermediate-component(s) perform the odd-order pupil expansion and the even order pupil expansion, is performed by the output-coupler of the optical waveguide.

16. The method of claim 14, wherein:
the odd-order and even-order pupil expansion performed by the intermediate-component(s) achieves pupil expansion in a same direction; and the output-coupler performs pupil expansion in another direction.

17. A head-mounted display (HMD) or a heads-up display (HUD) system, comprising:
a display engine configured to produce an image;
an optical waveguide including input-coupler, one or more intermediate-components and an output-coupler;
the input-coupler configured to couple light corresponding to the image associated with the input pupil into the optical waveguide and diffract the light corresponding to the image in at least two different directions so that light corresponding to the image is diffracted toward each of the one or more intermediate-components;
the one or more intermediate-components configured to:
perform odd-order pupil expansion on the light corresponding to the image that travels in the first direction from the input-coupler to the one intermediate-component by way of total internal reflection (TIR),
perform even-order pupil expansion on the light corresponding to the image that travels in the second direction from the input-coupler to the one intermediate-component by way of TIR,
the output-coupler configured to couple the light corresponding to the image, that has travelled from the one or more intermediate-components to the output-coupler by way of TIR, out of the optical waveguide so that the light corresponding to the image is viewable from the output-pupil;
wherein the light that experiences odd-order pupil expansion by changes propagation direction an odd number of times before being incident on the output-coupler; and
wherein the light that experiences even-order pupil expansion changes propagation direction an even number of times before being incident on the output-coupler.

18. The system of claim 17, wherein the one or more intermediate-components consists of one intermediate-component configured to:
diffract the light corresponding to the image towards the output-coupler.

19. The system of claim 17, wherein:
the one or more intermediate-components comprise at least two intermediate-components that are spatially separated from one another.

20. The system of claim 17, wherein a more uniform intensity distribution is achieved by the input-coupler diffracting the light corresponding to the image in at least two different directions so that light corresponding to the image is diffracted toward each of the one or more intermediate-components, and by the one or more intermediate-components individually or collectively performing both odd-order and even-order pupil expansion, compared to if the input-coupler diffracted the light corresponding to the image in only one direction towards an intermediate-component that performed only one of odd-order or even-order pupil expansion.

* * * * *